United States Patent
Celestinos Arroyo et al.

(10) Patent No.: US 11,689,875 B2
(45) Date of Patent: Jun. 27, 2023

(54) AUTOMATIC SPATIAL CALIBRATION FOR A LOUDSPEAKER SYSTEM USING ARTIFICIAL INTELLIGENCE AND NEARFIELD RESPONSE

(71) Applicant: Samsung Electronics Co., Ltd., Gyeonggi-do (KR)

(72) Inventors: Adrian Celestinos Arroyo, Valencia, CA (US); Victor Manuel Chin Lopez, Tijuana (MX)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 17/558,380

(22) Filed: Dec. 21, 2021

(65) Prior Publication Data

US 2023/0032280 A1     Feb. 2, 2023

Related U.S. Application Data

(60) Provisional application No. 63/226,654, filed on Jul. 28, 2021.

(51) Int. Cl.
    *H04S 7/00*      (2006.01)
    *H04R 5/02*      (2006.01)
    (Continued)

(52) U.S. Cl.
    CPC ............ *H04S 7/301* (2013.01); *G06N 3/04* (2013.01); *G06N 3/08* (2013.01); *H04R 5/02* (2013.01);
    (Continued)

(58) Field of Classification Search
None
See application file for complete search history.

(56) References Cited

U.S. PATENT DOCUMENTS

| | | | |
|---|---|---|---|
| 8,932,134 B2 * | 1/2015 | Andall | H04S 7/303 381/303 |
| 9,426,598 B2 | 8/2016 | Walsh et al. | |

(Continued)

FOREIGN PATENT DOCUMENTS

| | | |
|---|---|---|
| KR | 10-1764274 B2 | 7/2017 |
| KR | 10-2021-0043663 A | 8/2019 |
| KR | 10-2098886 B2 | 4/2020 |

OTHER PUBLICATIONS

International Search Report & Written Opinion dated Oct. 5, 2022 for International Application No. PCT/KR2022/009065 from the Korean Intellectual Property Office, pp. 1-13, Republic of Korea.

*Primary Examiner* — Paul W Huber
(74) *Attorney, Agent, or Firm* — Sherman IP LLP; Kenneth L. Sherman; Hemavathy Perumal

(57) ABSTRACT

One embodiment provides a method of automatic spatial calibration. The method comprises estimating one or more distances from one or more loudspeakers to a listening area based on a machine learning model and one or more propagation delays from the one or more loudspeakers to the listening area. The method further comprises estimating one or more incidence angles of the one or more loudspeakers relative to the listening area based on the one or more propagation delays. The method further comprises applying spatial perception correction to audio reproduced by the one or more loudspeakers based on the one or more distances and the one or more incidence angles. The spatial perception correction comprises delay and gain compensation that corrects misplacement of any of the one or more loudspeakers relative to the listening area.

20 Claims, 16 Drawing Sheets

(51) Int. Cl.
*H04R 5/04* (2006.01)
*G06N 3/08* (2023.01)
*G06N 3/04* (2023.01)
*H04S 3/00* (2006.01)

(52) U.S. Cl.
CPC ............... *H04R 5/04* (2013.01); *H04S 3/008* (2013.01); *H04S 2400/01* (2013.01); *H04S 2400/13* (2013.01); *H04S 2400/15* (2013.01)

(56) References Cited

U.S. PATENT DOCUMENTS

| | | |
|---|---|---|
| 9,672,805 B2 | 6/2017 | Kim et al. |
| 10,299,060 B2 * | 5/2019 | Satheesh ................. H04S 7/305 |
| 10,575,114 B2 | 2/2020 | Shi et al. |
| 11,026,021 B2 | 6/2021 | Matsukawa et al. |
| 11,388,537 B2 * | 7/2022 | Patil ........................ H04S 7/302 |
| 2006/0062410 A1 | 3/2006 | Kim et al. |
| 2007/0253561 A1 * | 11/2007 | Williams ................. H04S 7/301 600/28 |
| 2014/0133682 A1 | 5/2014 | Chabanne et al. |
| 2019/0090061 A1 | 3/2019 | Seldess et al. |

\* cited by examiner

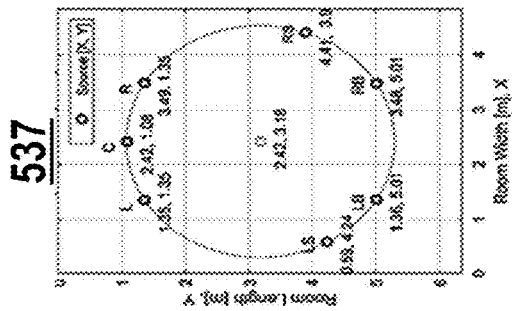
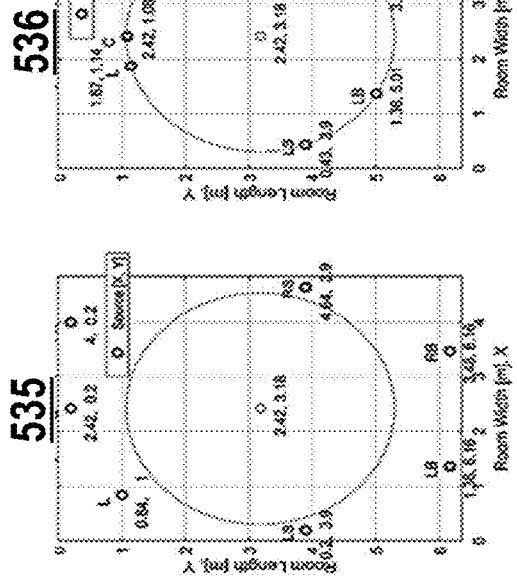
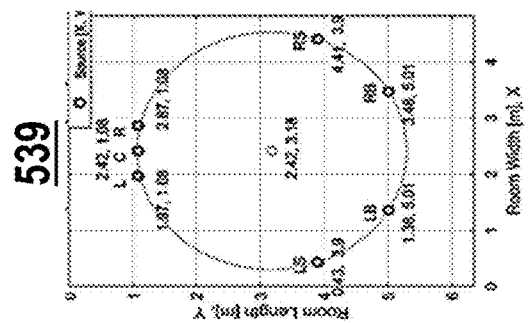
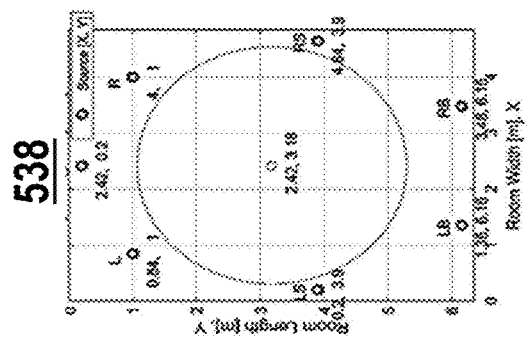
FIG. 9J
FIG. 9K
FIG. 9L
FIG. 9M
FIG. 9N

600

```
Estimating one or more distances from one or more loudspeakers to
a listening area based on a machine learning model and one or         — 610
more propagation delays from the one or more loudspeakers to the
                          listening area
                              ↓
Estimating one or more incidence angles of the one or more
loudspeakers relative to the listening area based on the one or       — 620
                  more propagation delays
                              ↓
Applying spatial perception correction to audio reproduced by the
one or more loudspeakers based on the one or more distances and
the one or more incidence angles, where the spatial perception        — 630
correction comprises delay and gain compensation that corrects
misplacement of any of the one or more loudspeakers relative to the
                          listening area
```

FIG. 11

AUTOMATIC SPATIAL CALIBRATION FOR A LOUDSPEAKER SYSTEM USING ARTIFICIAL INTELLIGENCE AND NEARFIELD RESPONSE

CROSS-REFERENCE TO RELATED APPLICATIONS

This application claims the priority benefit of U.S. Provisional patent application Ser. No. 63/226,654, filed Jul. 28, 2021, all incorporated herein by reference in their entirety.

TECHNICAL FIELD

One or more embodiments generally relate to loudspeaker systems, in particular, a method and system of automatic spatial calibration for a loudspeaker system using artificial intelligence and nearfield response.

BACKGROUND

Conventional multichannel sound reproduction or loudspeaker systems are designed according to standards, such as a standard for multichannel sound technology in home and broadcasting applications defined in the International Telecommunication Union (ITU) Report BS.2159-4 ("ITU standard"). Such systems are used to reproduce/playback multichannel content such as music, movies, or broadcast programs that are produced and recorded in accordance with the same standards. For example, for each speaker of a multichannel loudspeaker system, the ITU standard recommends an optimal angle and distance from the speaker towards the listener in order to reproduce, during reproduction/playback of multichannel content, the same spatial experience desired/intended by a creator (i.e., producer) of the content. However, users typically position speakers of a multichannel loudspeaker system within an area (e.g., a living room) in a non-uniform manner, such that angles and distances from the speakers to a listener in the area are not in accordance with the ITU standard. With such non-uniform speaker placements, the listener does not have the same spatial experience as desired/intended by the creator.

SUMMARY

One embodiment provides a method of automatic spatial calibration. The method comprises estimating one or more distances from one or more loudspeakers to a listening area based on a machine learning model and one or more propagation delays from the one or more loudspeakers to the listening area. The method further comprises estimating one or more incidence angles of the one or more loudspeakers relative to the listening area based on the one or more propagation delays. The method further comprises applying spatial perception correction to audio reproduced by the one or more loudspeakers based on the one or more distances and the one or more incidence angles. The spatial perception correction comprises delay and gain compensation that corrects misplacement of any of the one or more loudspeakers relative to the listening area.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 9J is an example graph illustrating a sixth example displaced loudspeaker setup, in one or more embodiments;

FIG. 9K is an example graph illustrating a seventh example displaced loudspeaker setup, in one or more embodiments;

FIG. 9L is an example graph illustrating an eighth example displaced loudspeaker setup, in one or more embodiments;

FIG. 9M is an example graph illustrating a ninth example displaced loudspeaker setup, in one or more embodiments;

FIG. 9N is an example graph illustrating a tenth example displaced loudspeaker setup, in one or more embodiments;

FIG. 11 is a flowchart of an example process for automatic spatial calibration, in one or more embodiments.

DETAILED DESCRIPTION

Figure 1:
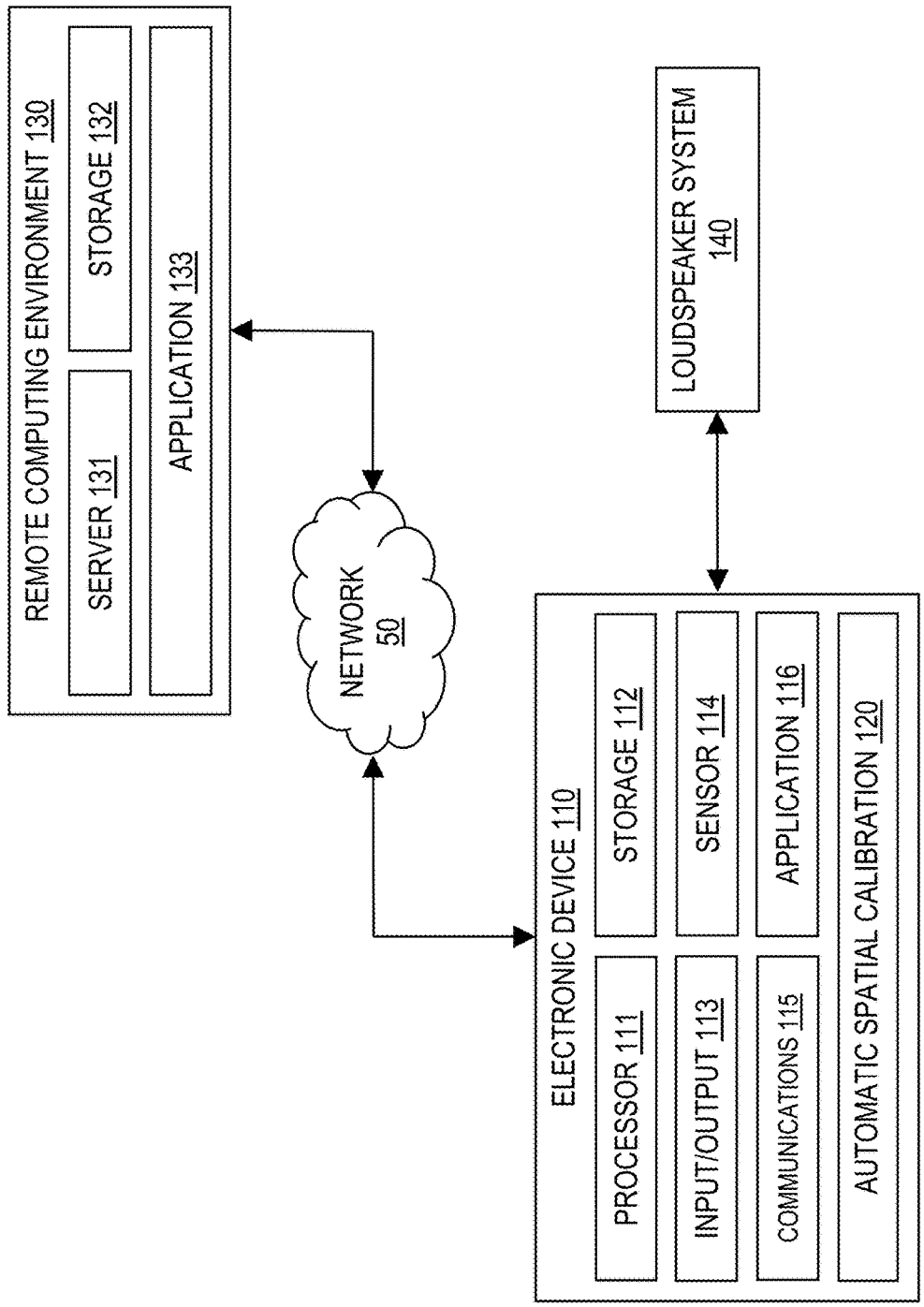
FIG. 1 is an example computing architecture for implementing automatic spatial calibration, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to loudspeaker systems, in particular, a method and system of automatic spatial calibration for a loudspeaker system using artificial intelligence and nearfield response. One embodiment provides a method for automatic spatial calibration. The method comprises estimating one or more distances from one or more loudspeakers to a listening area based on a machine learning model and one or more propagation delays from the one or more loudspeakers to the listening area. The method further comprises estimating one or more incidence angles of the one or more loudspeakers relative to the listening area based on the one or more propagation delays. The method further comprises applying spatial perception correction to audio reproduced by the one or more loudspeakers based on the one or more distances and the one or more incidence angles. The spatial perception correction comprises delay and gain compensation that corrects misplacement of any of the one or more loudspeakers relative to the listening area.

One or more embodiments provide a method and system for automatically or dynamically optimizing a sound field produced by one or more loudspeakers of a multichannel loudspeaker system relative to a listener in a listening area. The sound field is automatically or dynamically optimized without interaction from the listener/user and in spite of placement of the one or more loudspeakers. In one embodiment, a distance from each loudspeaker to the listener is automatically estimated (i.e., automatic loudspeaker distance estimation) based on propagation delays from each loudspeaker to the listening area. The propagation delays are estimated utilizing nearfield microphones and artificial intelligence (e.g., a neural network).

In one embodiment, an incidence angle of each loudspeaker relative to the listener is automatically estimated (i.e., automatic loudspeaker incidence angle estimation) based on the propagation delays and utilizing an array of microphones in the listening area.

In one embodiment, to correct misplacement of the one or more loudspeakers, delay and gain compensation is automatically applied based on each estimated distance and each estimated incidence angle to adjust a spatial experience of the listener during audio reproduction of content (i.e., automatic loudspeaker compensation). The adjusted spatial experience substantially matches a spatial experience desired/intended by a creator of the content.

FIG. 1 is an example computing architecture 100 for implementing automatic spatial calibration, in one or more embodiments. The computing architecture 100 comprises an electronic device 110 including computing resources, such as one or more processor units 111 and one or more storage units 112. One or more applications may execute/operate on the electronic device 110 utilizing the computing resources of the electronic device 110.

In one embodiment, the one or more applications 116 on the electronic device 110 include an automatic spatial calibration system 120 that provides automatic spatial calibration for a loudspeaker system 140 integrated in or coupled to the electronic device 110. The loudspeaker system 140 comprises one or more loudspeakers for audio reproduction.

For example, in one embodiment, the one or more loudspeakers include at least one loudspeaker 151 (FIG. 2A) designed for reproducing mid-frequency and high-frequency sounds and, optionally, at least one subwoofer 152 (FIG. 2A) designed for reproducing low-frequency sounds. The one or more loudspeakers are arranged in a room or other space that includes a listening area 170 (FIG. 2B). The listening area 170 represents a spatial area within the room or other space where one or more listeners (i.e., users) will be positioned during the audio reproduction (via the loudspeaker system 140).

In one embodiment, the automatic spatial calibration system 120 provides automatic spatial calibration using artificial intelligence and nearfield response. For example, in one embodiment, the system 120 is configured to: (1) estimate, using a machine learning model (e.g., a feedforward neural network), a distance of each loudspeaker to the listening area 170 based one or more propagations delays between the one or more loudspeakers, (2) estimate an incidence angle of each loudspeaker to the listening area 170 based on the one or more propagation delays, and (3) if any loudspeaker is misplaced (i.e., relative to the listening area 170, the loudspeaker is not positioned at an ideal/standard loudspeaker placement that is in accordance with the ITU standard), correct the misplacement by applying to audio reproduced by the one or more loudspeakers spatial perception correction including delay and gain compensation. As described in detail later herein, the spatial perception correction is based on an estimated distance and an estimated incidence angle of each loudspeaker relative to the listening area 170.

Examples of an electronic device 110 include, but are not limited to, a media system including an audio system, a media playback device including an audio playback device, a television (e.g., a smart television), a mobile electronic device (e.g., an optimal frame rate tablet, a smart phone, a laptop, etc.), a wearable device (e.g., a smart watch, a smart band, a head-mounted display, smart glasses, etc.), a gaming console, a video camera, a media playback device (e.g., a DVD player), a set-top box, an Internet of Things (IoT) device, a cable box, a satellite receiver, etc.

In one embodiment, the electronic device 110 comprises one or more sensor units 114 integrated in or coupled to the electronic device 110, such as a camera, a microphone, a GPS, a motion sensor, etc.

In one embodiment, the electronic device 110 comprises one or more input/output (I/O) units 113 integrated in or coupled to the electronic device 110. In one embodiment, the one or more I/O units 113 include, but are not limited to, a physical user interface (PUI) and/or a graphical user interface (GUI), such as a keyboard, a keypad, a touch interface, a touch screen, a knob, a button, a display screen, etc. In one embodiment, a user can utilize at least one I/O unit 113 to configure one or more user preferences, configure one or more parameters, provide user input, etc.

In one embodiment, the one or more applications on the electronic device 110 may further include one or more software mobile applications 116 loaded onto or downloaded to the electronic device 110, such as an audio streaming application, a video streaming application, etc. A software mobile application 116 on the electronic device 110 may exchange data with the automatic spatial calibration system 120.

In one embodiment, the electronic device 110 comprises a communications unit 115 configured to exchange data with a remote computing environment, such as a remote computing environment 130 over a communications network/ connection 50 (e.g., a wireless connection such as a Wi-Fi connection or a cellular data connection, a wired connection, or a combination of the two). The communications unit 115 may comprise any suitable communications circuitry operative to connect to a communications network and to exchange communications operations and media between the electronic device 110 and other devices connected to the same communications network 50. The communications unit 115 may be operative to interface with a communications network using any suitable communications protocol such as, for example, Wi-Fi (e.g., an IEEE 802.11 protocol), Bluetooth©, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 130 includes computing resources, such as one or more servers 131 and one or more storage units 132. One or more applications 133 that provide higher-level services may execute/operate on the remote computing environment 130 utilizing the computing resources of the remote computing environment 130.

In one embodiment, the one or more applications 133 include a training system 180 (FIG. 7) configured to perform off-device (i.e., offline) processing including obtaining training data and/or training and testing a machine learning model (e.g., a feedforward neural network) based on the training data. A resulting trained machine learning model is deployed for use by the automatic spatial calibration system 120.

In one embodiment, the remote computing environment 130 provides an online platform for hosting one or more online services (e.g., an audio streaming service, a video streaming service, etc.) and/or distributing one or more applications. For example, the machine learning model and/or the automatic spatial calibration system 120 may be loaded onto or downloaded to the electronic device 110 from the remote computing environment 130 that maintains and distributes updates for the machine learning model and/or the system 120. As another example, a remote computing environment 130 may comprise a cloud computing environment providing shared pools of configurable computing system resources and higher-level services.

In one embodiment, the automatic spatial calibration system 120 is integrated into, or implemented as part of, a loudspeaker control system or a loudspeaker management system.

As rooms and other spaces are typically not designed for use with satellite loudspeakers (surround loudspeakers), these loudspeakers are often difficult to arrange in a room or other space at ideal/standard loudspeaker placements that are in accordance with the ITU standard. Typically, users place satellite loudspeakers on the ceiling or on furniture. One or more embodiments may be implemented in soundbars with satellite loudspeakers to correct any misplacement of the loudspeakers and provide spatial perception correction. One or more embodiments may be implemented in TVs for use in combination with soundbars and surround loudspeakers.

One or more embodiments provide a standard stereo setup that increases immersion and spatial experience of a listener in the listening area 170.

Figure 2A:
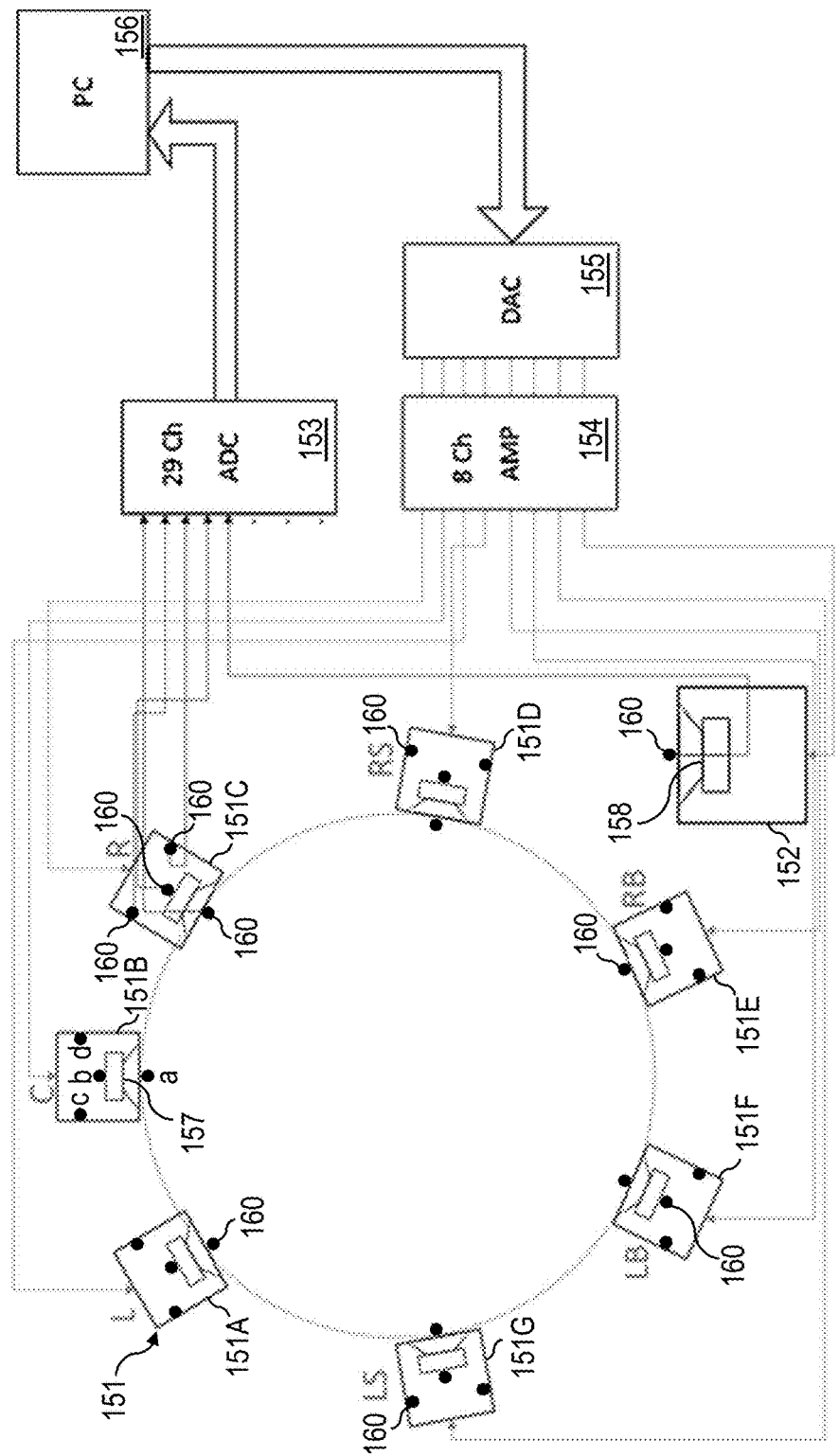
FIG. 2A illustrates an example multichannel loudspeaker system, in one or more embodiments.
Figure 2B:
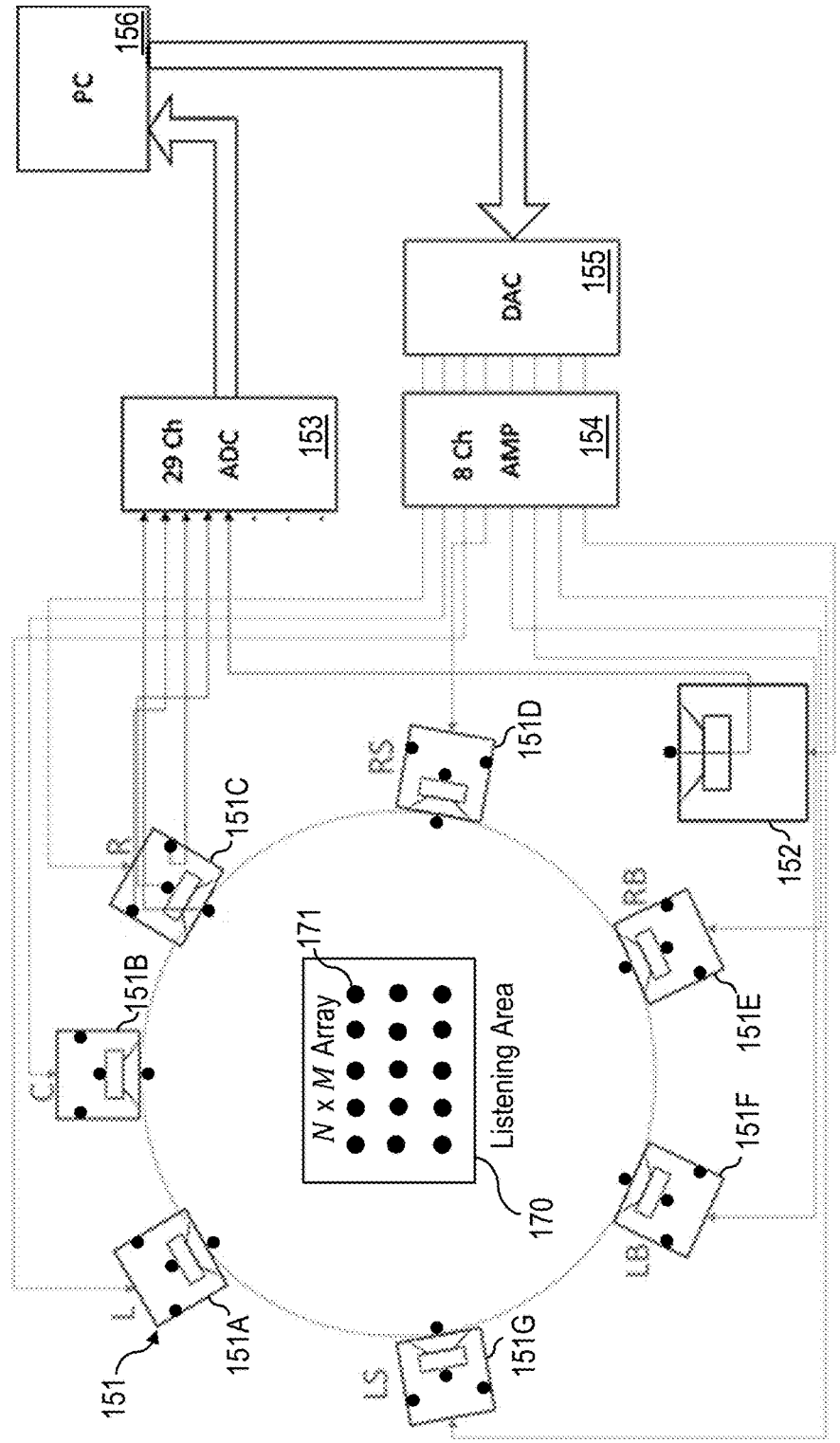
FIG. 2B illustrates an example listening area relative to the loudspeaker system, in one or more embodiments.

FIG. 2A illustrates an example multichannel loudspeaker system 150, in one or more embodiments. In one embodiment, the loudspeaker system 140 in FIG. 1 is implemented as the multichannel loudspeaker system 150. The loudspeaker system 150 comprises a plurality of loudspeakers 151 designed for reproducing mid-frequency and high-frequency sounds. In one embodiment, each loudspeaker 151 includes a main woofer/driver 157 for reproducing audio. In one embodiment, the plurality of loudspeakers 151 are designed for placement in accordance with the ITU standard, i.e., the ITU standard defines/recommends an ideal/standard loudspeaker placement for each loudspeaker 151. For example, in one embodiment, the plurality of loudspeakers 151 include a first loudspeaker 151A with an ideal/standard loudspeaker placement at a front left of a room ("L loudspeaker"), a second loudspeaker 151B with an ideal/standard loudspeaker placement at a front center of the room ("C loudspeaker"), a third loudspeaker 151C with an ideal/standard loudspeaker placement at a front right of the room ("R loudspeaker"), a fourth loudspeaker 151D with an ideal/standard loudspeaker placement at a side right of the room ("RS loudspeaker"), a fifth loudspeaker 151E with an ideal/standard loudspeaker placement at a back right of the room ("RB loudspeaker"), a sixth loudspeaker 151F with an ideal/standard loudspeaker placement at a back left of the room ("LB loudspeaker"), and a seventh loudspeaker 151G with an ideal/standard loudspeaker placement at a side left of the room ("LS loudspeaker").

In one embodiment, the loudspeaker system 150 comprises a plurality of audio channels, wherein each audio channel corresponds to a loudspeaker 151 of the loudspeaker system 150, and each audio channel provides, as output, audio reproduced by the corresponding loudspeaker 151. For example, in one embodiment, the plurality of audio channels include a L channel providing audio reproduced by the L loudspeaker, a C channel providing audio reproduced by the C loudspeaker, a R channel providing audio reproduced by the R loudspeaker, a RS channel providing audio reproduced by the RS loudspeaker, a RB channel providing audio reproduced by the RB loudspeaker, a LB channel providing audio reproduced by the LB loudspeaker, and a LS channel providing audio reproduced by the LS loudspeaker.

In one embodiment, each loudspeaker 151 includes at least nearfield (NF) microphone 160 positioned within proximity of a main woofer/driver 157 of the loudspeaker 151. For example, in one embodiment, each loudspeaker 151 includes at least one of the following: a NF microphone 160 positioned at a front of a main woofer/driver 157 (e.g., a NF microphone 160 positioned at "a" in FIG. 2A), a NF microphone positioned behind the main woofer/driver 157 (e.g., a NF microphone 160 positioned at "b" in FIG. 2A), a NF microphone positioned to a right of the main woofer/driver 157 (e.g., a NF microphone 160 positioned at "c" in FIG. 2A), or a NF microphone positioned to a left of the main woofer/driver 157 (e.g., a NF microphone 160 positioned at "d" in FIG. 2A).

In one embodiment, the loudspeaker system 150 optionally includes one or more subwoofers 152 designed for reproducing low-frequency sounds. For example, in one embodiment, the loudspeaker system 150 includes one subwoofer 152, as shown in FIG. 2A. In one embodiment, each subwoofer 152 includes a main woofer/driver 158 for reproducing audio. In one embodiment, each subwoofer 152 includes at least one NF microphone 160 positioned within proximity of a main woofer/driver 158 of the subwoofer 152.

As described in detail later herein, in one embodiment, the automatic calibration system 120 utilizes each NF microphone 160 of each loudspeaker (e.g., loudspeaker 151, subwoofer 152) to determine a propagation delay from the loudspeaker to the NF microphone 160.

In another embodiment, each loudspeaker (e.g., loudspeaker 151, subwoofer 152) has an array of NF microphones 160 positioned within proximity of a main woofer/driver of the loudspeaker.

In one embodiment, the loudspeaker system 150 comprises an analog-to-digital converter (ADC) 153 configured to: (1) receive analog signals captured by each microphone 160, and (2) convert the analog signals to digital signals. For example, if the loudspeaker system 150 includes seven loudspeakers 151 and one subwoofer 152 as shown in FIG. 2A, and if each loudspeaker 151 includes four NF microphones 160 and the subwoofer 152 includes one NF microphone 160, the ADC 153 comprises twenty-nine (29) input channels total for receiving analog signals.

In one embodiment, the loudspeaker system 150 comprises a processor controller (PC) 156 configured to: (1) receive digital signals from the ADC 153, and (2) provide the digital signals to the automatic spatial calibration system 120 for automatic spatial calibration of the loudspeaker system 150. The PC 156 is further configured to: (1) receive digital signals from an input source (e.g., an audio streaming application/service) for audio reproduction via the loudspeaker system 150, and (2) apply digital signal processing (DSP) to the digital signals.

In one embodiment, the loudspeaker system 150 comprises a digital-to-analog converter (DAC) 155 configured to: (1) receive processed digital signals from the PC 156, and (2) convert the processed digital signals to analog signals.

In one embodiment, the loudspeaker system 150 comprises an amplifier 154 configured to: (1) receive one or more analog signals from the DAC 155, (2) amplify the one or more analog signals, and (3) provide the one or more amplified analog signals to one or more loudspeakers (e.g., loudspeaker 151, subwoofer 152) for reproduction. For example, if the loudspeaker system 150 includes seven loudspeakers 151 and one subwoofer 152 as shown in FIG. 2A, the amplifier 154 comprises eight output channels for outputting amplified analog signals.

FIG. 2B illustrates an example listening area 170 relative to the loudspeaker system 150, in one or more embodiments.

As described in detail later herein, training data representing ground truth data is acquired (e.g., via a training system 180 in FIG. 7) in a training phase. The training data comprises one or more measured data sets captured in the training phase using an array of microphones 171. For example, in one embodiment, to acquire training data in the training phase, the listening area 170 is defined by an N×M array of microphones 171, wherein N denotes a number of microphones 171 arranged along a first direction (e.g., x-direction), and wherein M denotes a number of microphones 171 arranged along a second direction opposite of the first direction (e.g., y-direction). The array of microphones 171 comprises at least two microphones 171. In one embodiment, the microphones 171 are equally spaced apart in the training phase.

In one embodiment, the training data is augmented with one or more simulated data sets using simulation of propagation delays. In the training phase, the training data is used to train and test (e.g., via a training system 180 in FIG. 7) a machine learning model (e.g., a feedforward neural network). In a deployment phase, a trained machine learning model resulting from the training phase is deployed (e.g., deployed as a feedforward neural network 230 in FIG. 3) for use by the automatic spatial calibration system 120.

Figure 3:
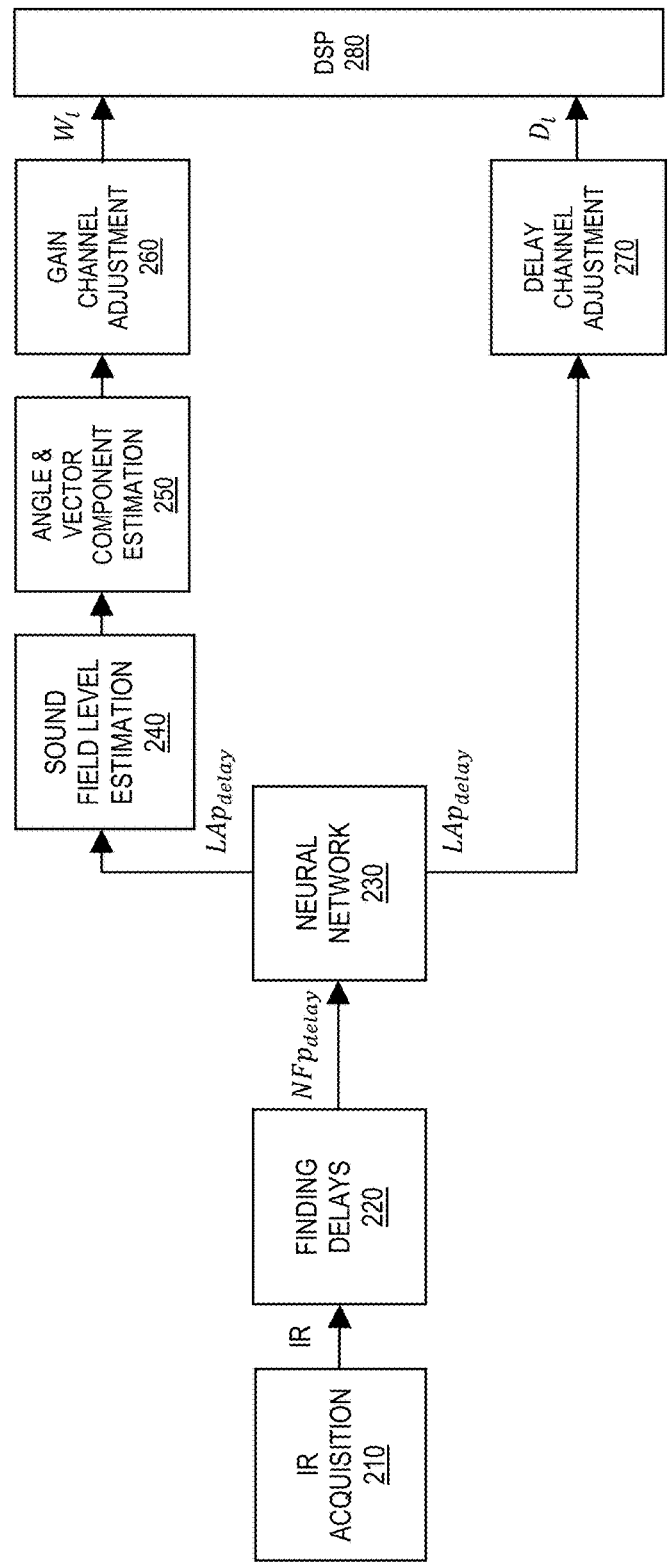
FIG. 3 illustrates an example automatic spatial calibration system, in one or more embodiments.

FIG. 3 illustrates an example automatic spatial calibration system 200, in one or more embodiments. In one embodiment, the automatic spatial calibration system 120 in FIG. 1 is implemented as the automatic spatial calibration system 200.

In one embodiment, the system 200 comprises an impulse response (IR) acquisition unit 210. For each loudspeaker (e.g., loudspeaker 151, subwoofer 152), the IR acquisition unit 210 is configured to: (1) receive one or more digital signals (e.g., from the PC 156), wherein the one or more digital signals are converted from one or more analog signals captured by one or more NF microphones 160 of the loudspeaker, and (2) measure a corresponding IR/transfer function from the loudspeaker to the one or more NF microphones 160 based on the one or more digital signals. In one embodiment, an IR/transfer function corresponding to a loudspeaker is measured using MLS signals, logarithmic sine sweeps, and/or other methods.

In one embodiment, the system 200 comprises a finding delays unit 220. For each loudspeaker (e.g., loudspeaker 151, subwoofer 152), the finding delays unit 220 is configured to: (1) receive an IR/transfer function corresponding to the loudspeaker (e.g., from the IR acquisition unit 210), and (2) determine, based on the IR/transfer function, one or more propagation delays $NFp_{delay}$ from the loudspeaker to one or more NF microphones 160 of the loudspeaker. In one embodiment, the finding delays unit 220 determines a propagation delay $NFp_{delay}$ based on an IR/transfer function utilizing one or more methods such as, but not limited to, a cross-correlation or max peak function finder.

In one embodiment, the system 200 comprises an optional LP filter configured for pre-processing an IR/transfer function before the IR/transfer function is utilized by the finding delays unit 220 to determine a propagation delay $NFp_{delay}$.

In one embodiment, the system 200 comprises a trained neural network 230. For example, in one embodiment, the neural network 230 is a feedforward neural network 230. As another example, in one embodiment, the neural network 230 is another type of neural network.

In one embodiment, the neural network 230 is trained in the training phase (e.g., via a training system 180 in FIG. 7) using training data comprising measured data sets captured by a N×M array of microphones 171 (FIG. 2B). For each loudspeaker (e.g., loudspeaker 151, subwoofer 152), the neural network 230 is configured to: (1) receive, as one or more inputs, one or more propagation delays $NFp_{delay}$ from the loudspeaker to one or more NF microphones 160 of the loudspeaker, and (2) estimate/predict, based on the one or more inputs, one or more propagation delays $LAp_{delay}$ from the loudspeaker to a listening area 170 within the same room or other space as the loudspeaker system 150, wherein each propagation delay $LAp_{delay}$ is provided as an output. For example, in one embodiment, an error for an estimated/predicted propagation delay $LAp_{delay}$ is +4.6 cm.

In another embodiment, the system 200 estimates/predicts one or more propagation delays $LAp_{delay}$ from a loudspeaker (e.g., loudspeaker 151, subwoofer 152) to the listening area 170 using linear algebra and/or least squares regression. The one or more propagation delays $LAp_{delay}$ are approximated from one or more propagation delays $NFp_{delay}$ from the loudspeaker to one or more NF microphones 160 of the loudspeaker.

In one embodiment, the system 200 comprises a sound field level estimation unit 240. For each loudspeaker (e.g., loudspeaker 151, subwoofer 152), the sound field level estimation unit 240 is configured to: (1) receive at least one propagation delay $LAp_{delay}$ (e.g., from the neural network 230) representing at least one estimated/predicted propagation delay from the loudspeaker to the listening area 170, and (2) estimate a sound pressure level (SPL) of the loudspeaker at the listening area 170 based on the at least one propagation delay $LAp_{delay}$.

Let rl_r0 generally denote one or more distances from a loudspeaker to one or more microphones 171 of the listening area 170 that are used to acquire training data in the training phase. For example, if the listening area 170 comprises a single microphone 171, rl_r0 is single value representing a distance from a loudspeaker to the single microphone 171. As another example, if the listening area 170 comprises a N×M array of microphones 171 that are used to acquire training data in the training phase, rl_r0 is a N×M matrix of values representing distances from a loudspeaker to each microphone 171 of the array.

Let pl generally denote a sound pressure of a loudspeaker at the listening area 170. Let LAspl generally denote a SPL of a loudspeaker at the listening area 170.

In one embodiment, estimating a SPL LAspl of a loudspeaker at the listening area 170 comprises: (1) estimating one or more distances rl_r0 from the loudspeaker to the listening area 170 based on one or more propagation delays $LAp_{delay}$ from the loudspeaker to the listening area 170, (2) estimating a sound pressure pl of the loudspeaker at the listening area 170 based on the one or more distances rl_r0, and (3) estimating the SPL LAspl based on the sound pressure pl.

In one embodiment, the sound field level estimation unit 240 estimates one or more distances rl_r0 from a loudspeaker (e.g., loudspeaker 151, subwoofer 152) to the listening area 170 in accordance with equation (1) provided below:

$$rl\_r0 = c \cdot LAp_{delay} \quad (1),$$

wherein c is the speed of sound in air (i.e., c=343 m/s).

In one embodiment, the sound field level estimation unit 240 estimates a sound pressure pl of a loudspeaker (e.g., loudspeaker 151, subwoofer 152) at the listening area 170 in accordance with equation (2) provided below:

$$pl(m) = \frac{A(m)}{rl\_r0} \cdot e^{j(\omega(m) \cdot t(tr) - k(m) \cdot rl\_r0)}, \quad (2)$$

wherein A is a frequency spectrum of the loudspeaker, m is a frequency/FFT bin from frequency/FFT bins ranging from DC (0 Hz) to $$\frac{Fs}{2},$$

Fs is a sampling frequency, and tr is time (steady state). In one embodiment, Fs=48000, and tr=1 second.

In one embodiment, the sound field level estimation unit 240 estimates a SPL LAspl of a loudspeaker (e.g., loudspeaker 151, subwoofer 152) at the listening area 170 in accordance with equation (3) provided below:

$$LAspl = 20\log_{10}\left(\frac{pl}{p_{ref}}\right), \quad (3)$$

wherein $p_{ref}$ is a reference pressure. In one embodiment, $p_{ref}=20^{-6}$.

In another embodiment, estimating a SPL LAspl of a loudspeaker at the listening area 170 comprises predicting the SPL LAspl at discrete frequencies using artificial intelligence (e.g., a neural network).

In one embodiment, the system 200 comprises an angle and vector component estimation unit 250. For each loudspeaker (e.g., loudspeaker 151, subwoofer 152), the angle and vector component estimation unit 250 is configured to: (1) receive at least one propagation delay $LAp_{delay}$ (e.g., from the neural network 230) representing at least one estimated/predicted propagation delay from the loudspeaker to the listening area 170, (2) receive a sound pressure pl (e.g., from the sound field level estimation unit 240) of the loudspeaker at the listening area 170, and (3) estimate a corresponding incidence angle and corresponding vector components (i.e., components of a vector) based on the at least one propagation delay $LAp_{delay}$ and the sound pressure pl.

In one embodiment, if the listening area 170 comprises a N×M array of microphones 171 that are used to acquire training data in the training phase, rl_r0 is a two-dimensional (i.e., N×M) matrix of values representing a plurality of distances from a loudspeaker to the array of microphones 171. Each value of the matrix rl_r0 corresponds to a microphone 171 of the array, represents a distance from the loudspeaker to the corresponding microphone 171, and is included in a row and a column of the matrix rl_r0 that corresponds to a location of the corresponding microphone 171 along the x-direction and the y-direction. For example, if the array is 3×5 and comprises fifteen microphones 171 equally spaced apart (i.e., spacing between the microphones 171 along the x-direction and the y-direction is equal), the matrix rl_r0 comprises fifteen values distributed across three rows and five columns $$\left(e.g., rl\_r0 = \begin{vmatrix} 2.2295 & 2.3581 & 2.5225 & 2.7154 & 2.9369 \\ 2.5368 & 2.6440 & 2.7940 & 2.9727 & 3.1727 \\ 2.8655 & 2.9584 & 3.0941 & 3.2442 & 3.4300 \end{vmatrix}\right).$$

Let $\theta_I$ generally denote an incidence angle of a loudspeaker relative to the listening area 170. In one embodiment, the angle and vector component estimation unit 250 estimates an incidence angle $\theta_I$ of a loudspeaker (e.g., loudspeaker 151, subwoofer 152) relative to the listening area 170 in accordance with equation (4) provided below:

$$\theta_I = \arctan2\left(\frac{\partial rl\_r0}{\partial x}, \frac{\partial rl\_r0}{\partial y}\right), \quad (4)$$

wherein $$\frac{\partial rl\_r0}{\partial x}$$

is a difference in one or more values of matrix rl_r0 along the x-direction, and $$\frac{\partial rl\_r0}{\partial y}$$

is a difference in one or more values of the matrix rl_r0 along the y-direction. Let $\nabla(rl\_r0)$ generally denote a numerical gradient that returns a x component and a y component of the matrix rl_r0, and $$\frac{\partial rl\_r0}{\partial x}, \frac{\partial rl\_r0}{\partial y} = \nabla(rl\_r0).$$

As shown in equation (4) provided above, the angle and vector component estimation unit 250 estimates the incidence angle $\theta_l$ utilizing the numerical gradient $\nabla(rl\_r0)$ and a four quadrant inverse tangent.

Let $V_x$ generally denote a vector component along the x-direction corresponding to a loudspeaker, and let $V_y$ generally denote a vector component along the y-direction corresponding to the loudspeaker. In one embodiment, the angle and vector component estimation unit 250 estimates vector components $V_x$ and $V_y$ corresponding to a loudspeaker (e.g., loudspeaker 151, subwoofer 152) in accordance with equations (5)-(6) provided below:

$$V_x = R \cos(\text{mean}(\theta_l)) \quad (5), \text{ and}$$

$$V_y = R \sin(\text{mean}(\theta_l)) \quad (6),$$

wherein each vector component $V_x$, $V_y$ is based on an average (i.e., mean) of an incidence angle $\theta_l$ of the loudspeaker relative to the listening area 170, R is a magnitude of a vector comprising the vector component $V_x$ and $V_y$, and $$R = \frac{pl}{p_{ref}}.$$

Let $W_l$ generally denote a gain compensation weight (i.e., weight compensation) corresponding to a loudspeaker. In one embodiment, the system 200 comprises a gain channel adjustment unit 260. For each loudspeaker (e.g., loudspeaker 151, subwoofer 152), the gain channel adjustment unit 260 is configured to: (1) receive one or more distances rl_r0 from the loudspeaker to the listening area 170 (e.g., from the sound field level estimation unit 240), (2) receive an incidence angle $\theta_l$ of the loudspeaker relative to the listening area 170 (e.g., from the angle and vector component estimation unit 250), and (3) determine an optimal gain compensation weight (i.e., optimal weight compensation) $W_l$ corresponding to the loudspeaker based on the one or more distances rl_r0 and the incidence angle $\theta_l$. In one embodiment, the gain channel adjustment unit 260 determines an optimal gain compensation weight $W_l$ corresponding to a loudspeaker utilizing an optimization technique such as a non-linear optimization function or any other optimization technique. The gain channel adjustment unit 260 optimizes a gain compensation weight for each audio channel of the loudspeaker system 150 (i.e., gain channel optimization).

Let $D_l$ generally denote a correction delay corresponding to a loudspeaker. In one embodiment, the system 200 comprises a delay channel adjustment unit 270. For each loudspeaker (e.g., loudspeaker 151, subwoofer 152), the delay channel adjustment unit 270 is configured to: (1) receive one or more distances rl_r0 from the loudspeaker to the listening area 170 (e.g., from the sound field level estimation unit 240), (2) receive an incidence angle $\theta_l$ of the loudspeaker relative to the listening area 170 (e.g., from the angle and vector component estimation unit 250), and (3) determine an optimal correction delay $D_l$ corresponding to the loudspeaker based on the one or more distances rl_r0 and the incidence angle $\theta_l$. In one embodiment, the delay channel adjustment unit 270 determines an optimal correction delay $D_l$ corresponding to a loudspeaker utilizing an optimization technique such as a non-linear optimization function or any other optimization technique. The delay channel adjustment unit 270 optimizes a correction delay for each audio channel of the loudspeaker system 150 (i.e., delay channel optimization).

In one embodiment, the system 200 comprises a DSP system 280. For each loudspeaker (e.g., loudspeaker 151, subwoofer 152), the DSP system 280 is configured to: (1) receive a corresponding gain compensation weight $W_l$ (e.g., from the gain channel adjustment unit 260), (2) receive corresponding correction delay $D_l$ (e.g., from the delay channel adjustment unit 270), and (3) automatically apply the corresponding gain compensation weights $W_l$ and the corresponding correction delay $D_l$ to an audio channel providing audio reproduced by the loudspeaker to correct misplacement of any loudspeaker of the loudspeaker system 150 and correct spatial audio perception (i.e., provide correct spatial audio immersion). Therefore, even if a loudspeaker of the loudspeaker system 150 is misplaced, the system 200 provides an optimal sound field by compensating an incidence angle of each loudspeaker of the loudspeaker system 150 relative to the listening area 170 based on all other loudspeakers of the loudspeaker system 150. The system 200 automatically optimizes the sound field produced by the loudspeaker system 150 (e.g., standard stereo setup) with respect to a listener in the listening area 170 without user interaction.

In one embodiment, the DSP system 280 is integrated into, or implemented as part of, a PC 156 (FIG. 2A) of the loudspeaker system 150.

The system 200 adjusts a spatial experience of a listener in the listening area 170 during audio reproduction of content (via the loudspeaker system 150). The adjusted spatial experience substantially matches a spatial experience desired/intended by a creator of the content even if a loudspeaker of the loudspeaker system 150 is not at an ideal/standard loudspeaker placement relative to the listening area 170, an incidence angle of a loudspeaker of the loudspeaker system 150 is incorrect relative to the listening area 170, and/or a loudspeaker of the loudspeaker system 150 is missing (e.g., the C loudspeaker is missing).

In another embodiment, the system 200 obtains a distance from each loudspeaker (e.g., loudspeaker 151, subwoofer 152) to a listener in the listening area 170 using at least one of the following methods that do not require a NF microphone 160: using a camera of the electronic device 110 (e.g., a TV), direct measurement by a user, or measurement of IR with an external microphone or a microphone included in mobile device (e.g., a smart phone).

Figure 4:
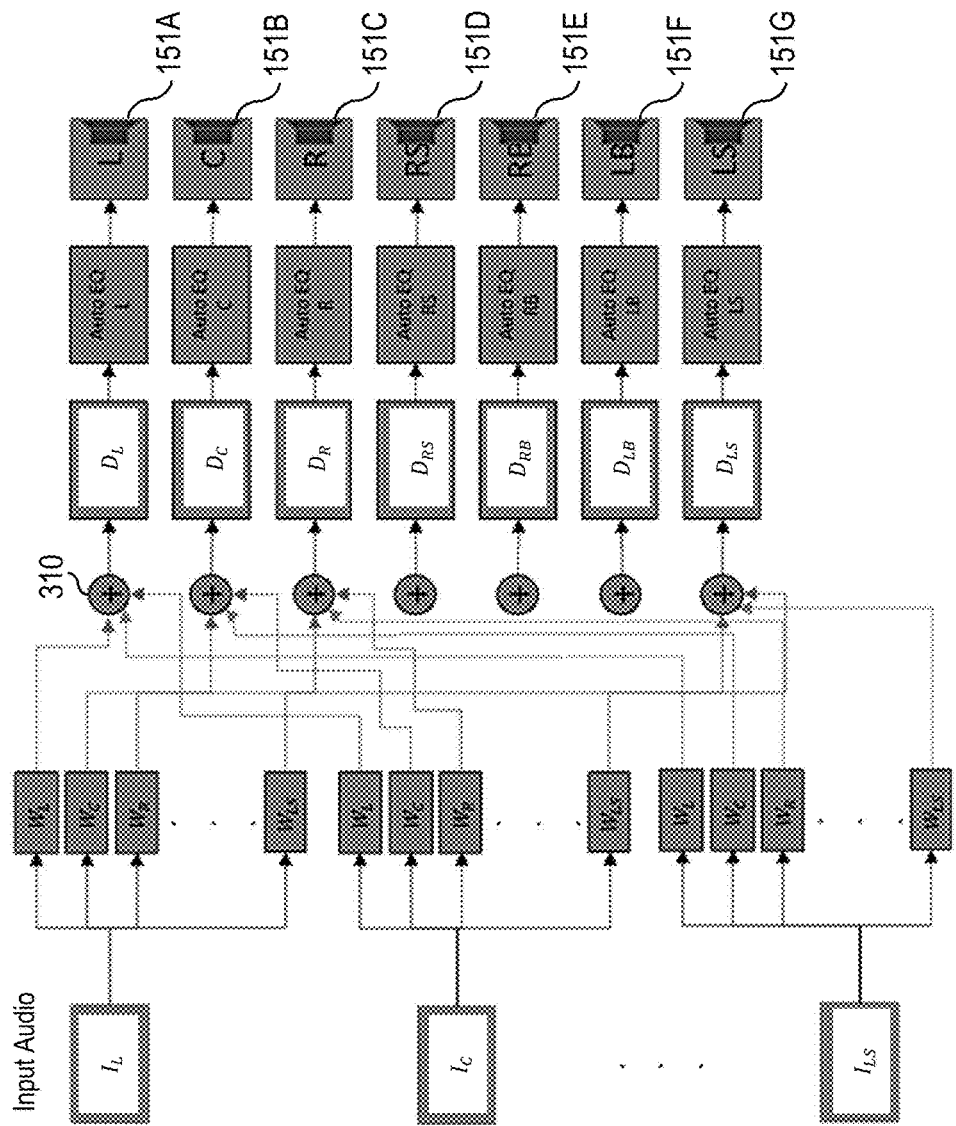
FIG. 4 illustrates an example digital signal processing (DSP) system, in one or more embodiments.

FIG. 4 illustrates an example DSP system 300, in one or more embodiments. In one embodiment, the DSP system 280 in FIG. 3 is implemented as the DSP system 300.

In the deployment phase, the loudspeaker system 150 receives content from an input source (e.g., an audio streaming application/service) for audio reproduction. For each audio channel of the loudspeaker system 150, the loudspeaker system 150 receives input audio to reproduce via a corresponding loudspeaker (e.g., loudspeaker 151, subwoofer 152). For example, in one embodiment, the loudspeaker system 150 receives input audio $I_L$ for the L channel, input audio $I_C$ for the C channel, input audio $I_R$ for the R channel, input audio $I_{RS}$ for the RS channel, input audio $I_{RB}$ for the RB channel, input audio $I_{LB}$ for the LB channel, and input audio $I_{LS}$ for the LS channel.

In one embodiment, the DSP system 300 is configured to: (1) receive input audio $I_L$, $I_C$, $I_R$, . . . , and $I_{LS}$ for the L channel, the C channel, the R channel, . . . , and the LS channel, respectively (e.g., from an input source), (2) receive gain compensation weights $W_L$, $W_C$, $W_R$, ..., and $W_{LS}$ corresponding to the L channel, the C channel, the R channel, ..., and the LS channel, respectively (e.g., from the gain channel adjustment unit 260), and (3) apply the gain compensation weight $W_L$, $W_C$, $W_R$, ..., and $W_{LS}$ to the L channel, the C channel, the R channel, ..., and the LS channel, respectively, utilizing adders 310.

The DSP system 300 is further configured to: (1) receive correction delay $D_L$, $D_C$, $D_R$, ..., and $D_{LS}$ corresponding to the L channel, the C channel, the R channel, ..., and the LS channel, respectively (e.g., from the delay channel adjustment unit 270), and (2) apply the correction delay $D_L$, $D_C$, $D_R$, ..., and $D_{LS}$ to the L channel, the C channel, the R channel, ..., and the LS channel, respectively.

The DSP system 300 is further configured to apply auto equalization (EQ) to each audio channel of the loudspeaker system 150. For example, in one embodiment, the DSP system 300 applies pre-determined auto EQ settings Auto EQ L, Auto EQ C, Auto EQ R, ..., and Auto EQ LS to the L channel, the C channel, the R channel, ..., and the LS channel, respectively. The L channel, the C channel, the R channel, ..., and the LS channel provide, as output, audio resulting from the auto EQ and reproduced by the L loudspeaker, the C loudspeaker, the R loudspeaker, ..., and the LS loudspeaker, respectively.

The DSP system 300 provides spatial perception correction including correction delays and gain compensations to correct for any misplacement of a loudspeaker (e.g., loudspeaker 151, subwoofer 152). Therefore, even if a loudspeaker of the loudspeaker system 150 is misplaced, the DSP 300 provides an optimal sound field by compensating an incidence angle of a loudspeaker of the loudspeaker system 150 based on all other loudspeakers of the loudspeaker system 150. For example, if an incidence angle of the L loudspeaker relative to the listening area 170 is −39° instead of −30° as recommended by the ITU standard, the L loudspeaker is misplaced. The DSP system 300 provides spatial perception correction including correction delays and gain compensations to correct for the misplacement of the L loudspeaker (e.g., compensation gains and correction delays are applied to the L channel and other audio channels, especially the C channel, to correct the incidence angle of the L loudspeaker to −30° as recommended by the ITU standard).

Figure 5:
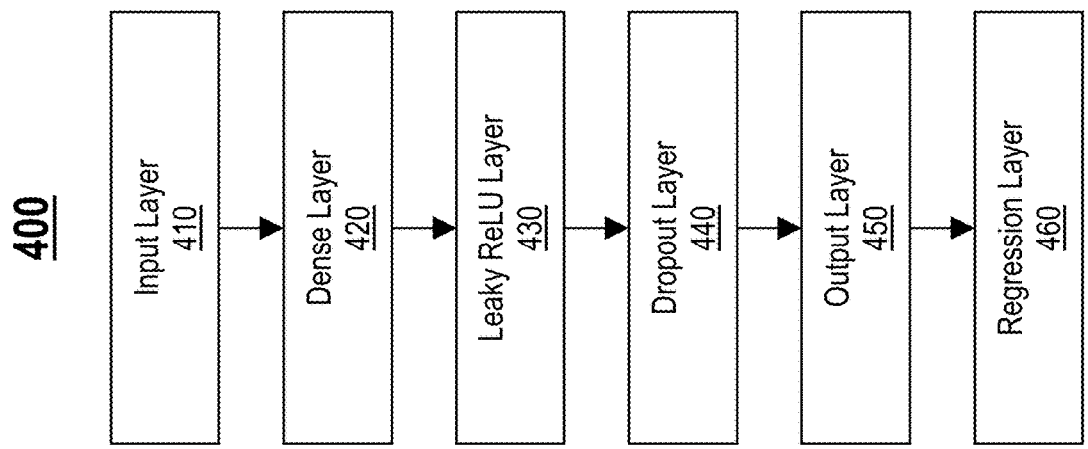
FIG. 5 illustrates an example neural network, in one or more embodiments.

FIG. 5 illustrates an example neural network 400, in one or more embodiments. In one embodiment, the neural network 230 in FIG. 3 is implemented as the neural network 400.

In one embodiment, the neural network 400 comprises a plurality of layers including, but not limited to, an input layer 410, a dense layer 420, a leaky ReLU layer 430, a dropout layer 440, an output layer 450, and a regression layer 460.

The input layer 410 is configured to receive, for each loudspeaker (e.g., loudspeaker 151, subwoofer 152), as one or more inputs, one or more propagation delays $NFp_{delay}$ from the loudspeaker (e.g., loudspeaker 151, subwoofer 152) to one or more NF microphones 160 of the loudspeaker (e.g., loudspeaker 151, subwoofer 152) (e.g., from the finding delays unit 220). For example, in one embodiment, if the loudspeaker system 150 comprises seven loudspeakers 151, the input layer 410 receives, as inputs, seven vectors, wherein each vector corresponds to a particular loudspeaker 151, and comprises at least one propagation delay $NFp_{delay}$ from the loudspeaker 151 to M microphones 160 of the loudspeaker 151.

The dense layer 420 is a fully connected layer configured to receive inputs from the input layer 410 and provide outputs to the leaky ReLU layer 430. For example, in one embodiment, if the loudspeaker system 150 comprises seven loudspeakers 151, an input size of the dense layer 420 is set to 7, an output size of the dense layer 420 is set to 1888, weights of the dense layer 420 are 1888×7, and a bias of the dense layer 420 is 1888×1.

The leaky ReLU layer 430 is an activation layer configured to receive inputs from the dense layer 420, apply a leaky ReLU activation function to the inputs, and provide resulting outputs to the dropout layer 440. For example, in one embodiment, a scale of the leaky ReLU layer 430 is set to 0.01.

The dropout layer 440 is a dropout layer configured to receive inputs from the leaky ReLU layer 430, apply a dropout method to the inputs to reduce or prevent overfitting, and provide resulting outputs to the output layer 450. For example, in one embodiment, a probability of the dropout layer 440 is set to 0.2.

The output layer 450 is a fully connected layer configured to receive inputs from the dropout layer 440 and provide outputs to the regression layer 460. For example, in one embodiment, if the loudspeaker system 150 comprises seven loudspeakers 151, an input size of the output layer 450 is set to 1888, an output size of the output layer 450 is set to 15, weights of the output layer 450 are 15×1888, and a bias of the output layer is 15×1.

The regression layer 460 is a regression layer configured to receive inputs from the output layer 450, apply a loss function to the inputs, and provide resulting outputs (e.g., to one or more other components of the system 200). For example, in one embodiment, the regression layer 460 applies mean squared error (MSE) as the loss function.

Figure 6:
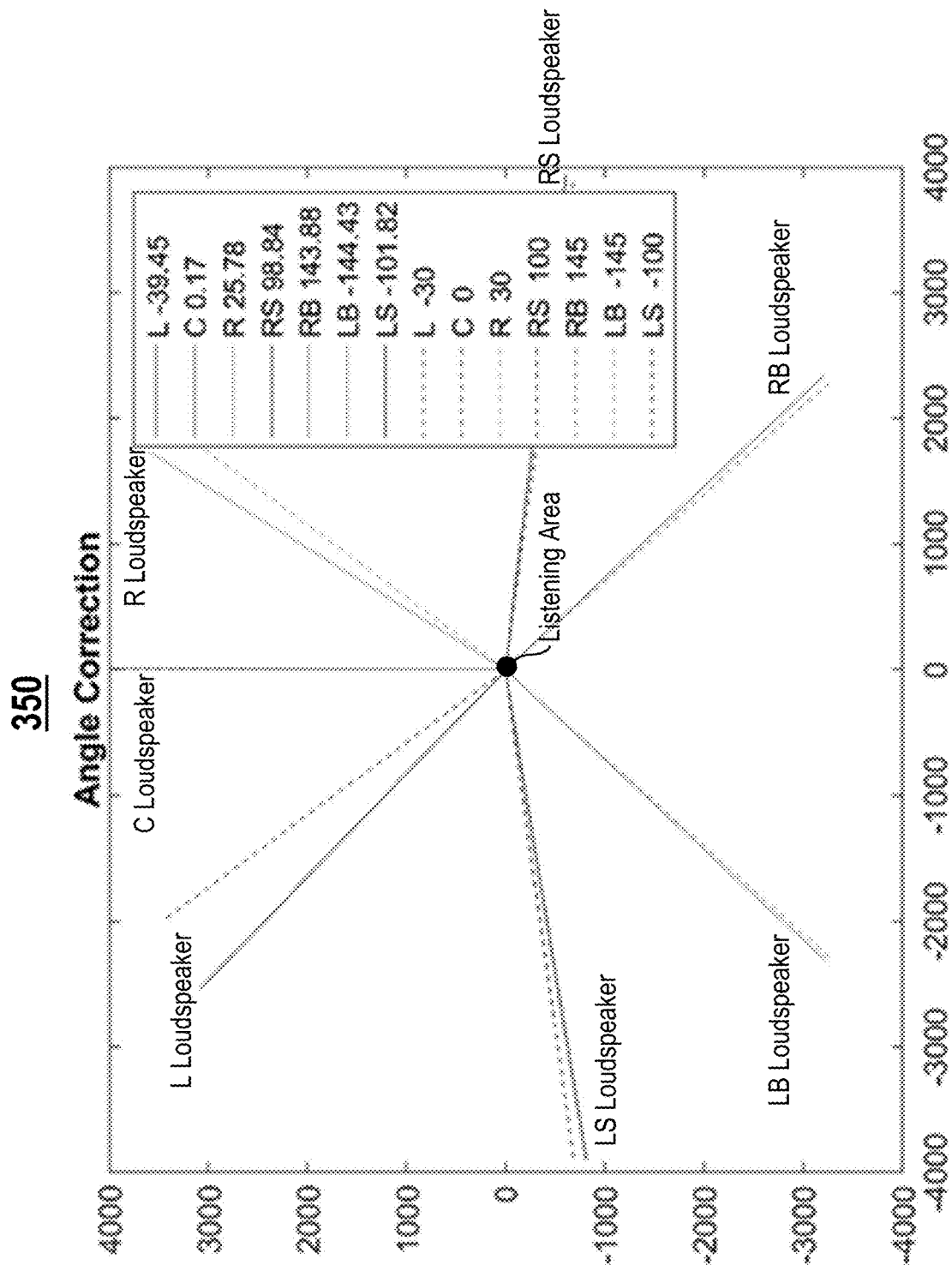
FIG. 6 is an example graph illustrating different incidence angles of different loudspeakers of the loudspeaker system relative to the listening area, in one or more embodiments.

FIG. 6 is an example graph 350 illustrating different incidence angles of different loudspeakers 151 of the loudspeaker system 150 relative to the listening area 170, in one or more embodiments. An origin (0,0) of the graph 350 represents the listening area 170. The listening area 170 is a point of incidence. Each solid line shown in FIG. 6 corresponds to a loudspeaker 151, and represents an incident wavefront of incident sound waves from the corresponding loudspeaker 151 (i.e., sound waves that travel from the corresponding loudspeaker 151 towards the point of incidence). The normal is perpendicular to the point of incidence. An incidence angle $\theta_I$ of a loudspeaker 151 relative to the listening area 170 is the angle which incident sound waves from the loudspeaker 151 makes with the normal.

As shown in FIG. 6, each loudspeaker 151 is misplaced relative to the listening area 170. Specifically, an incidence angle $\theta_L$ of the L loudspeaker is −39.45° relative to the listening area 170 instead of −30° as recommended by the ITU standard, an incidence angle $\theta_C$ of the C loudspeaker is 0.17° relative to the listening area 170 instead of 0° as recommended by the ITU standard, an incidence angle $\theta_R$ of the R loudspeaker is 25.78° relative to the listening area 170 instead of 30° as recommended by the ITU standard, an incidence angle $\theta_{RS}$ of the RS loudspeaker is 98.84° relative to the listening area 170 instead of 100° as recommended by the ITU standard, an incidence angle $\theta_{RB}$ of the RB loudspeaker is 143.880 relative to the listening area 170 instead of 145° as recommended by the ITU standard, an incidence angle $\theta_{LB}$ of the LB loudspeaker is −144.43° relative to the listening area 170 instead of −145° as recommended by the ITU standard, and an incidence angle $\theta_{LS}$ of the LS loudspeaker is −101.82° relative to the listening area 170 instead of −100° as recommended by the ITU standard.

The automatic spatial calibration system 200 compensates an incidence angle of each loudspeaker 151 relative to the listening area 170 by providing spatial perception correction including correction delays and gain compensations. Specifically, compensation gains and correction delays are applied to each audio channel of the loudspeaker system 150 to correct for the misplacement of each loudspeaker 151, such that the incidence angle $\theta_L$ of the L loudspeaker is corrected to −30°, the incidence angle $\theta_C$ of the C loudspeaker is corrected to 0°, the incidence angle $\theta_R$ of the R loudspeaker is corrected to 30°, the incidence angle $\theta_{RS}$ of the RS loudspeaker is corrected to 100°, the incidence angle $\theta_{RB}$ of the RB loudspeaker is corrected to 145°, the incidence angle $\theta_{LB}$ of the LB loudspeaker is corrected to −145°, and the incidence angle $\theta_{LS}$ of the LS loudspeaker is corrected to −100°. Each dashed line shown in FIG. 6 corresponds to a loudspeaker 151, and represents an incident wavefront of incident sound waves from the corresponding loudspeaker 151 after the spatial perception correction.

Figure 7:
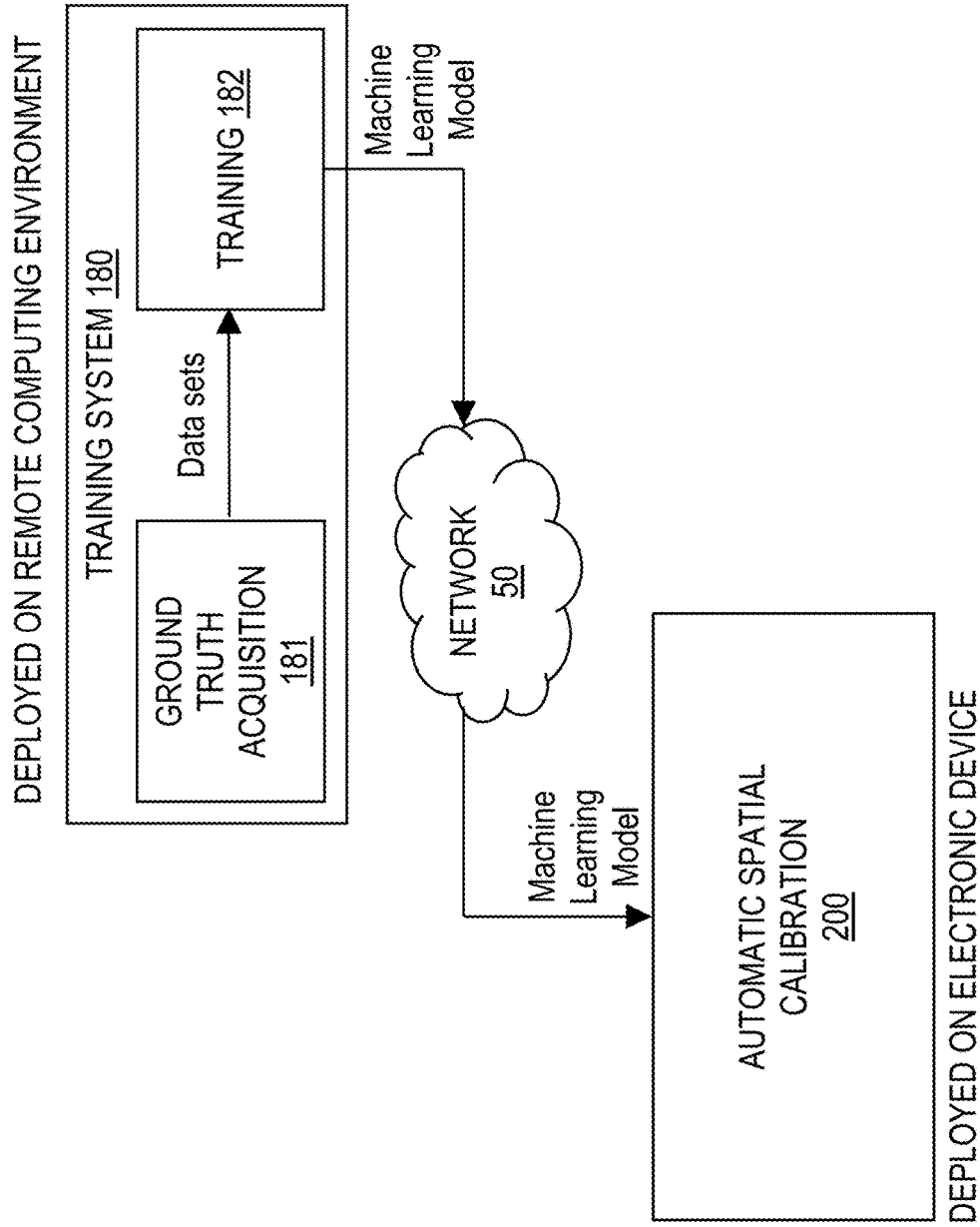
FIG. 7 illustrates an example training system, in one or more embodiments.

FIG. 7 illustrates an example training system 180, in one or more embodiments. In one embodiment, the neural network 230 is trained and tested, in the training phase, by a training system 180 deployed on a remote computing environment 130. In one embodiment, the training system 180 comprises a ground truth acquisition unit 181. In the training phase, the ground truth acquisition unit 181 is configured to acquire training data. In one embodiment, the training data comprises one or more measured data sets. Each measured data set comprises measurements captured using the microphones 171 of the listening area 170 with different loudspeaker placements.

In one embodiment, the ground truth acquisition unit 181 is configured to augment the training data with one or more simulated data sets. Each simulated data set comprises measurements obtained using simulation of propagation delays with different loudspeaker placements.

In one embodiment, the training system 180 comprises a training unit 182. In the training phase, the training unit 182 is configured to: (1) receive one or more measured data sets and, optionally, one or more simulated data sets (e.g., from the ground truth acquisition unit 181), and (2) train and test a machine learning model (e.g., a feedforward neural network) based on the training data. A resulting trained machine learning model is loaded onto or downloaded to the electronic device 110 and deployed as the neural network 230 for use by the automatic spatial calibration system 120 in the deployment phase.

Figure 8:
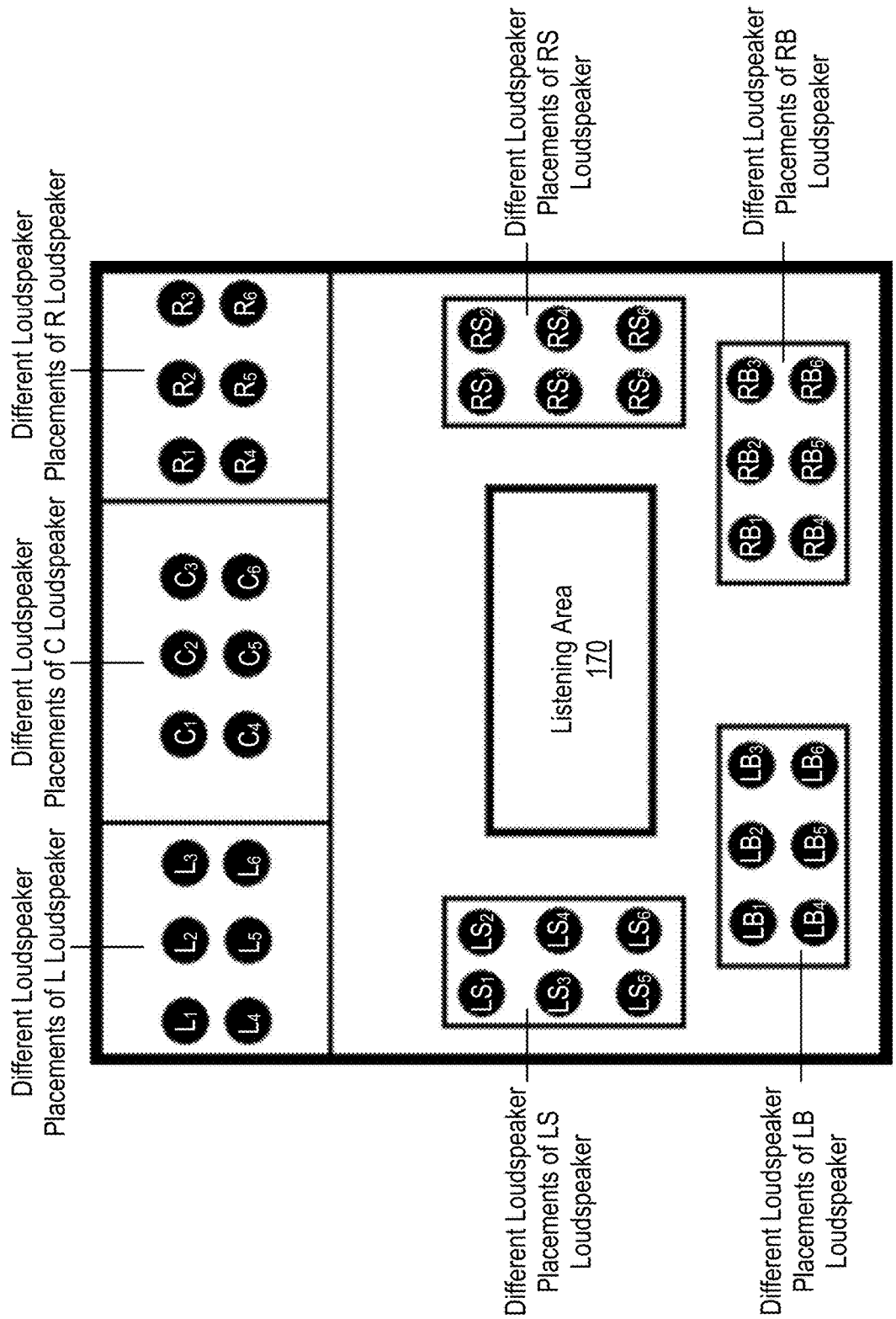
FIG. 8 illustrates an example of different loudspeaker placements relative to the listening area, in one or more embodiments.

FIG. 8 illustrates an example of different loudspeaker placements relative to the listening area 170, in one or more embodiments. In one embodiment, training data used to train and test the neural network 230 comprises one or more measured data sets, wherein each measured data set comprises measurements captured using the microphones 171 of the listening area 170 with different loudspeaker placements. Specifically, for each loudspeaker (e.g., loudspeaker 151, subwoofer 152), measurements are captured using the microphones 171 with different loudspeaker placements of the loudspeaker relative to the listening area 170. For example, in one embodiment, the training data includes at least the following: (1) a measured data set comprising measurements captured using the microphones 171 with different loudspeaker placements (e.g., $L_1$, $L_2$, ..., and/or $L_6$ as shown in FIG. 8) of the L loudspeaker, (2) a measured data set comprising measurements captured using the microphones 171 with different loudspeaker placements (e.g., $C_1$, $C_2$, ..., and/or $C_6$ as shown in FIG. 8) of the C loudspeaker, (3) a measured data set comprising measurements captured using the microphones 171 with different loudspeaker placements (e.g., $R_1$, $R_2$, ..., and/or $R_6$ as shown in FIG. 8) of the R loudspeaker, (4) a measured data set comprising measurements captured using the microphones 171 with different loudspeaker placements (e.g., $RS_1$, $RS_2$, ..., and/or $RS_6$ as shown in FIG. 8) of the RS loudspeaker, (5) a measured data set comprising measurements captured using the microphones 171 with different loudspeaker placements (e.g., $RB_1$, $RB_2$, ..., and/or $RB_6$ as shown in FIG. 8) of the RB loudspeaker, (6) a measured data set comprising measurements captured using the microphones 171 with different loudspeaker placements (e.g., $LB_1$, $LB_2$, ..., and/or $LB_6$ as shown in FIG. 8) of the LB loudspeaker, and (7) a measured data set comprising measurements captured using the microphones 171 with different loudspeaker placements (e.g., $LS_1$, $LS_2$, ..., and/or $LS_6$ as shown in FIG. 8) of the LS loudspeaker.

In one embodiment, the training data is augmented with one or more simulated data sets, wherein each simulated data comprises measurements obtained using simulation of propagation delays with different loudspeaker placements. Specifically, for each loudspeaker (e.g., loudspeaker 151, subwoofer 152), simulation of propagation delays with different loudspeaker placements of the loudspeaker is performed using simulation of monopoles and sound wave propagation. In one embodiment, for each loudspeaker (e.g., loudspeaker 151, subwoofer 152), monopoles and sound wave propagation are simulated (e.g., via the ground truth acquisition unit 181) in accordance with equations (7)-(8) provided below:

$$pm(m) = \frac{A(m)}{\text{rm\_r0}} \cdot e^{j(\omega(m)\cdot t(tr) - k(m)\cdot rm\_r0)}, \quad (7)$$

and $$pl(m) = \frac{A(m)}{\text{rl\_r0}} \cdot e^{j(\omega(m)\cdot t(tr) - k(m)\cdot rl\_r0)}, \quad (8)$$

wherein A is a frequency spectrum of the loudspeaker, m is a frequency/FFT bin from frequency/FFT bins ranging from $D_C$ (0 Hz) to $$\frac{Fs}{2},$$

Fs is a sampling frequency, rl_rm are one or more distances from the loudspeaker to one or more NF microphones 160 of the loudspeaker, and tr is time (steady state). In one embodiment, Fs=48000, and tr=1 second.

Let ir_pm generally denote an IR/transfer function from a loudspeaker to one or more NF microphones 160 of the loudspeaker, wherein the IR/transfer function is based on a monopole of the loudspeaker. Let ir_pl generally denote an IR/transfer function from a loudspeaker to one or more NF microphones 160 of the loudspeaker, wherein the IR/transfer function is based on a sound pressure of the loudspeaker. In one embodiment, for each loudspeaker (e.g., loudspeaker 151, subwoofer 152), corresponding IR/transfer functions ir_pm and ir_pl from the loudspeaker to one or more NF microphones 160 of the loudspeaker are determined in accordance with equations (9)-(10) provided below:

$$ir\_pm = irfft(pm) \quad (9), \text{ and}$$

$$ir\_pl = irfft(pl) \quad (10),$$

wherein irfft( ) is an inverse FFT.

FIGS. 9A-9B and 9E-9N are example graphs illustrating different loudspeaker setups in a listening room 172, in one or more embodiments. A horizontal axis of each graph of FIGS. 9A-9B and 9E-9N represents a width of the listening room 172 in units of width expressed in meters (m). A vertical axis of each graph of FIGS. 9A-9B and 9E-9N represents a length of the listening room 172 in units of length expressed in m. Let (x, y) generally denote left hand coordinates indicative of either a loudspeaker placement or a position of a listener in the listening room 172, wherein x is a coordinate along the horizontal axis, and y is a coordinate along the vertical axis.

Figure 9B:
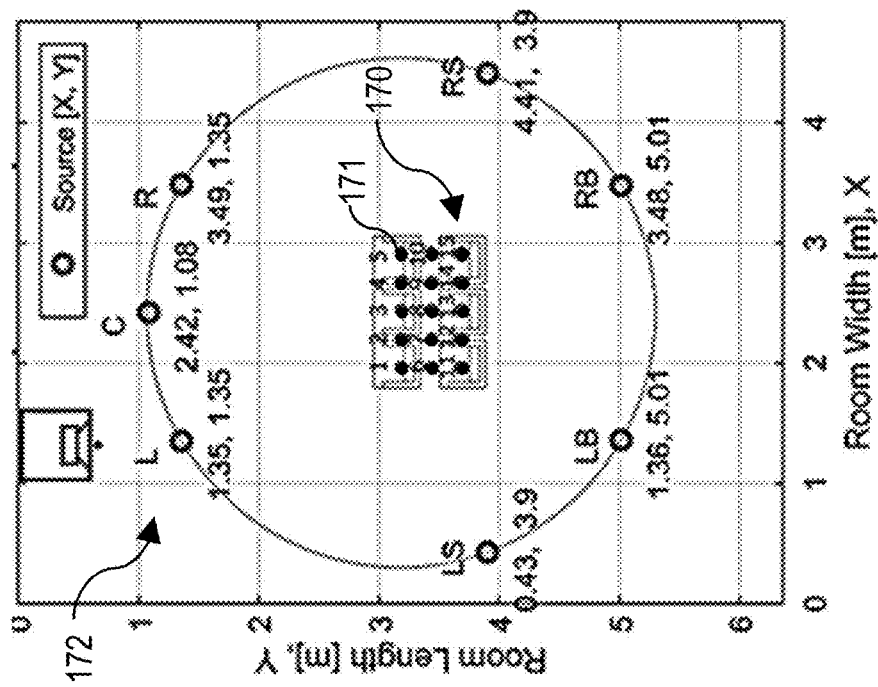
FIG. 9B is an example graph illustrating an example listening area, in one or more embodiments.
Figure 9A:
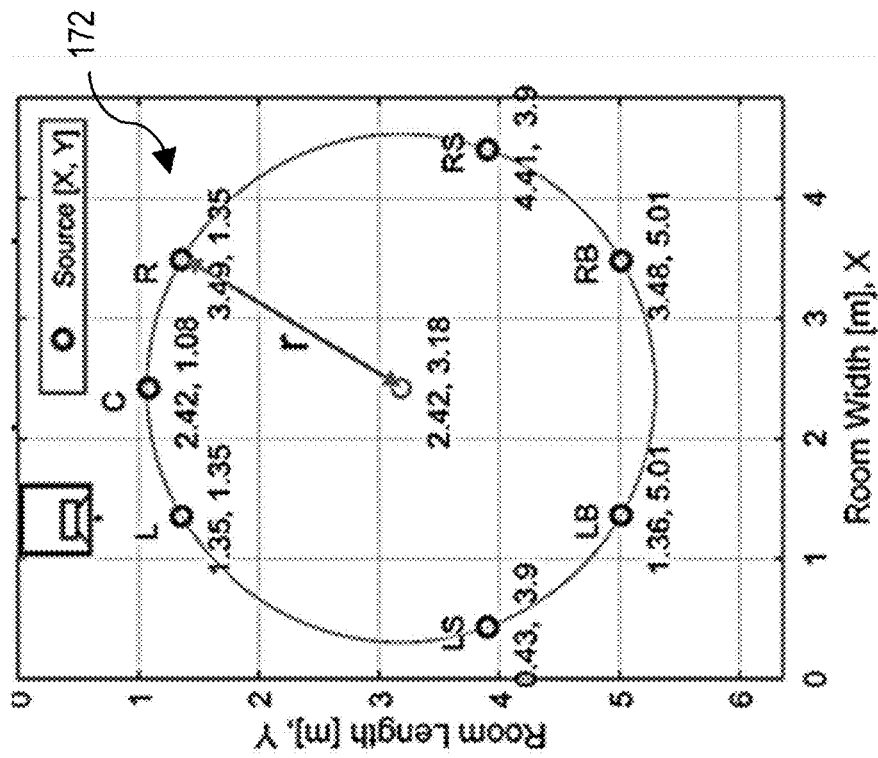
FIG. 9A is an example graph illustrating a standard loudspeaker setup, in one or more embodiments.

FIG. 9A is an example graph 500 illustrating a standard loudspeaker setup, in one or more embodiments. Assume a loudspeaker system 150 in the listening room 172 comprises seven compact loudspeakers 151—a L loudspeaker, a C loudspeaker, a R loudspeaker, a RS loudspeaker, a RB loudspeaker, a LB loudspeaker, and a LS loudspeaker. Each loudspeaker 151 has a height of 1.2 m.

As shown in FIG. 9A, the loudspeaker system 150 has a standard loudspeaker setup, i.e., each loudspeaker 151 is placed at an ideal/standard loudspeaker placement that is in accordance with ITU standard. Assume the position of the listener in the listening room 172 is (2.42, 3.18). Relative to the listener, an ideal/standard loudspeaker placement for the L loudspeaker is (1.35, 1.35) (i.e., at a front left of the listening room 172), an ideal/standard loudspeaker placement for the C loudspeaker is (2.42, 1.08) (i.e., at a front center of the listening room 172), an ideal/standard loudspeaker placement for the R loudspeaker is (3.49, 1.35) (i.e., at a front right of the listening room 172), an ideal/standard loudspeaker placement for the RS loudspeaker is (4.41, 3.9) (i.e., at a side right of the listening room 172), an ideal/standard loudspeaker placement for the RB loudspeaker is (3.48, 5.01) (i.e., at a back right of the listening room 172), an ideal/standard loudspeaker placement for the LB loudspeaker is (1.36, 5.01) (i.e., at a back left of the listening room 172), and an ideal/standard loudspeaker placement for the LB loudspeaker is (0.43, 3.9) (i.e., at a side left of the listening room 172). The loudspeakers 151 are arranged in a circle around the listener, such that a radius r from each loudspeaker 151 to the listener is 2.1145 m.

FIG. 9B is an example graph 510 illustrating an example listening area 170, in one or more embodiments. As shown in FIG. 9B, in one non-limiting example, in the training phase, a listening area 170 defined in the listening room 172 comprises a 3×5 array of microphones 171 that are equally spaced apart. The listening area 170 includes fifteen microphones 171 total (i.e., microphones labeled as '1', '2', '3', . . . , and '15' as shown in FIG. 9B). In another non-limiting example, in the training phase, the listening area 170 comprises only two microphones.

Figure 9D:
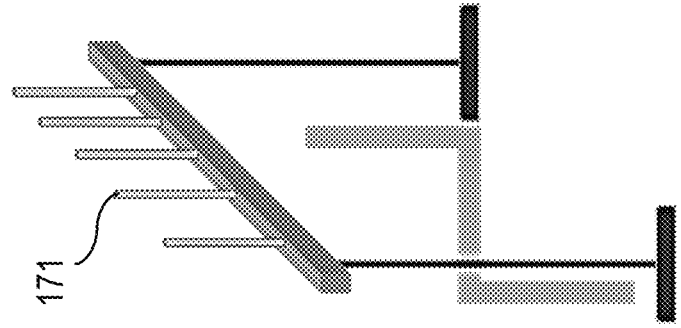
FIG. 9D is a side view of an example row of the array of microphones of FIG. 9C, in one or more embodiments.
Figure 9C:
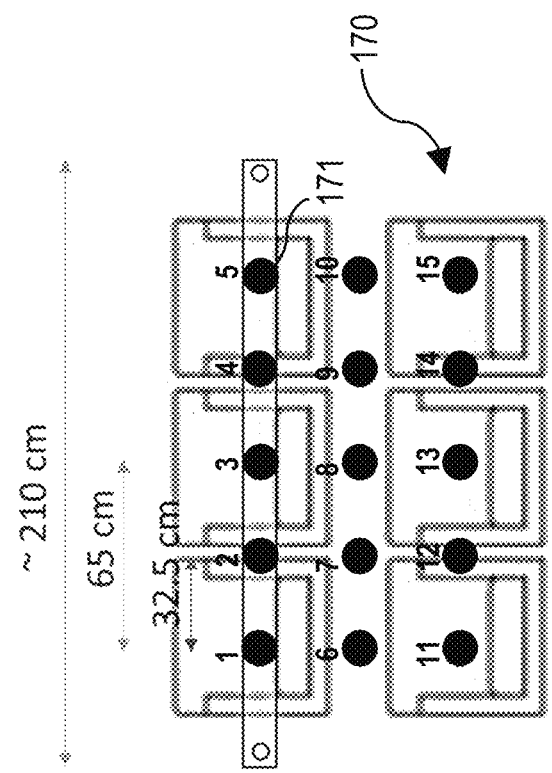
FIG. 9C is a close-up view of an example array of microphones of the listening area of FIG. 9B, in one or more embodiments.

FIG. 9C is a close-up view of an example array of microphones 171 of the listening area 170 of FIG. 9B, in one or more embodiments. In one embodiment, spacing between the microphones 171 along the x-direction and the y-direction is equal and adjustable. In one non-limiting example, a width of the listening area 170 is substantially about 210 cm, a distance between two directly adjacent microphones 171 along the x-direction is substantially about 32.5 cm, and a distance between any two microphones 171 that are separated by one microphone 171 along the x-direction is substantially about 65 cm. In another non-limiting example, a distance between two directly adjacent microphones 171 along the x-direction is substantially about 35 cm, and a distance between any two microphones 171 that are separated by one microphone 171 along the x-direction is substantially about 70 cm.

FIG. 9D is a side view of an example row of the array of microphones 171 of FIG. 9C, in one or more embodiments. In one non-limiting example, the 3×5 array of microphones 171 comprises three microphone stands 173, wherein each microphone stand 173 represents a row of the array of microphones 171, and each microphone stand 173 holds five microphones 171. In one embodiment, each microphone stand 173 is a holder bar or a rectangular frame.

For expository purposes, the term "displaced loudspeaker setup" as used in this specification generally refers to a loudspeaker setup for the loudspeaker system 150 in the listening room 172, wherein at least one loudspeaker (e.g., loudspeaker 151, subwoofer 152) of the loudspeaker system 150 is misplaced relative to the listener in the listening room 172 (i.e., not at an ideal/standard placement that is in accordance with ITU standard).

Figure 9E:
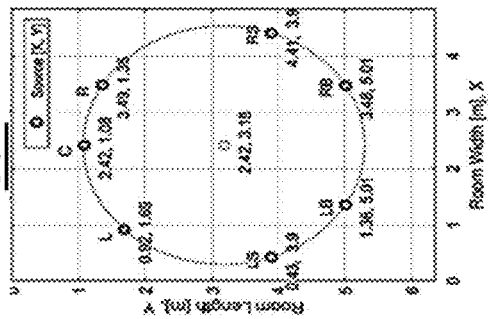
FIG. 9E is an example graph illustrating a first example displaced loudspeaker setup, in one or more embodiments.

FIGS. 9E-9N are example graphs illustrating ten different displaced loudspeaker setups in the listening room 172 of FIG. 9A, in one or more embodiments. In one embodiment, training data comprises measured data sets captured using the microphones 171 of the listening area 170 with the ten different displaced loudspeaker setups. Specifically, FIG. 9E is an example graph 530 illustrating a first example displaced loudspeaker setup, in one or more embodiments. As shown in FIG. 9E, in the first example displaced loudspeaker setup, a loudspeaker placement of the L loudspeaker is (0.84, 1.08). The L loudspeaker is misplaced (i.e., not at the ideal/standard loudspeaker placement for the L loudspeaker as shown in FIG. 9A).

Figure 9F:
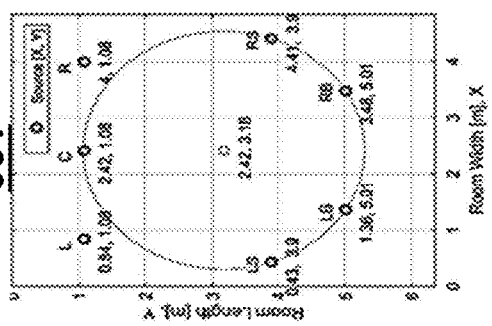
FIG. 9F is an example graph illustrating a second example displaced loudspeaker setup, in one or more embodiments.

FIG. 9F is an example graph 531 illustrating a second example displaced loudspeaker setup, in one or more embodiments. As shown in FIG. 9F, in the second example displaced loudspeaker setup, a loudspeaker placement of the L loudspeaker is (0.84, 1.08) and a loudspeaker placement of the R loudspeaker is (4, 1.08). The L loudspeaker and the R loudspeaker are misplaced (i.e., not at the ideal/standard loudspeaker placements of the L loudspeaker and the R loudspeaker as shown in FIG. 9A).

Figure 9G:
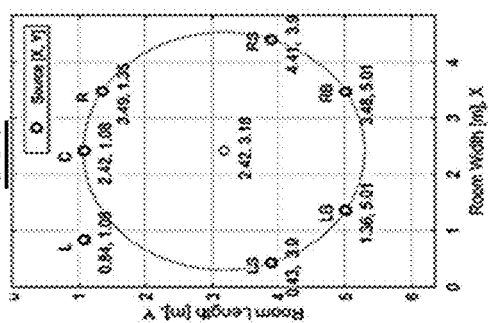
FIG. 9G is an example graph illustrating a third example displaced loudspeaker setup, in one or more embodiments.

FIG. 9G is an example graph 532 illustrating a third example displaced loudspeaker setup, in one or more embodiments. As shown in FIG. 9G, in the third example displaced loudspeaker setup, a loudspeaker placement of the L loudspeaker is (0.92, 1.69). The L loudspeaker is misplaced (i.e., not at the ideal/standard loudspeaker placement for the L loudspeaker as shown in FIG. 9A).

Figure 9H:
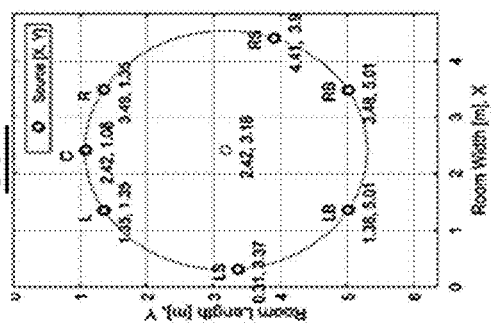
FIG. 9H is an example graph illustrating a fourth example displaced loudspeaker setup, in one or more embodiments.

FIG. 9H is an example graph 533 illustrating a fourth example displaced loudspeaker setup, in one or more embodiments. As shown in FIG. 9H, in the fourth example displaced loudspeaker setup, a loudspeaker placement of the L loudspeaker is (0.84, 0.2), a loudspeaker placement of the C loudspeaker is (2.42, 0.2), a loudspeaker placement of the R loudspeaker is (4, 0.2), a loudspeaker placement of the RS loudspeaker is (4.64, 3.9), a loudspeaker placement of the RB loudspeaker is (3.48, 6.16), a loudspeaker placement of the LB loudspeaker is (1.36, 6.16), and a loudspeaker placement of the LS loudspeaker is (0.2, 3.9). The L loudspeaker, the C loudspeaker, the R loudspeaker, the RS loudspeaker, the RB loudspeaker, the LB loudspeaker, and the LS loudspeaker are misplaced (i.e., not at the ideal/standard loudspeaker placements of the L loudspeaker, the C loudspeaker, the R loudspeaker, the RS loudspeaker, the RB loudspeaker, the LB loudspeaker, and the LS loudspeaker as shown in FIG. 9A).

Figure 9I:
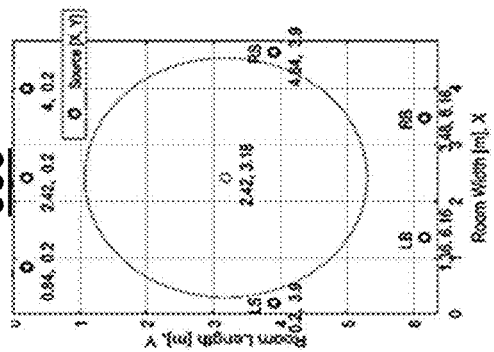
FIG. 9I is an example graph illustrating a fifth example displaced loudspeaker setup, in one or more embodiments.

FIG. 9I is an example graph 534 illustrating a fifth example displaced loudspeaker setup, in one or more embodiments. As shown in FIG. 9I, in the fifth example displaced loudspeaker setup, a loudspeaker placement of the LS loudspeaker is (0.31, 3.37). The LS loudspeaker is misplaced (i.e., not at the ideal/standard loudspeaker placement for the LS loudspeaker as shown in FIG. 9A).

FIG. 9J is an example graph 535 illustrating a sixth example displaced loudspeaker setup, in one or more embodiments. As shown in FIG. 9J, in the sixth example displaced loudspeaker setup, a loudspeaker placement of the L loudspeaker is (0.84, 1), a loudspeaker placement of the C loudspeaker is (2.42, 0.2), a loudspeaker placement of the R loudspeaker is (4, 0.2), a loudspeaker placement of the RS loudspeaker is (4.64, 3.9), a loudspeaker placement of the RB loudspeaker is (3.48, 6.16), a loudspeaker placement of the LB loudspeaker is (1.36, 6.16), and a loudspeaker placement of the LS loudspeaker is (0.2, 3.9). The L loudspeaker, the C loudspeaker, the R loudspeaker, the RS loudspeaker, the RB loudspeaker, the LB loudspeaker, and the LS loudspeaker are misplaced (i.e., not at the ideal/standard loudspeaker placements of the L loudspeaker, the C loudspeaker, the R loudspeaker, the RS loudspeaker, the RB loudspeaker, the LB loudspeaker, and the LS loudspeaker as shown in FIG. 9A).

FIG. 9K is an example graph 536 illustrating a seventh example displaced loudspeaker setup, in one or more embodiments. As shown in FIG. 9K, in the seventh example displaced loudspeaker setup, a loudspeaker placement of the L loudspeaker is (1.87, 1.14). The L loudspeaker is misplaced (i.e., not at the ideal/standard loudspeaker placement for the L loudspeaker as shown in FIG. 9A).

FIG. 9L is an example graph 537 illustrating an eighth example displaced loudspeaker setup, in one or more embodiments. As shown in FIG. 9L, in the eighth example displaced loudspeaker setup, a loudspeaker placement of the LS loudspeaker is (0.59, 4.24). The LS loudspeaker is misplaced (i.e., not at the ideal/standard loudspeaker placement for the LS loudspeaker as shown in FIG. 9A).

FIG. 9M is an example graph 538 illustrating a ninth example displaced loudspeaker setup, in one or more embodiments. As shown in FIG. 9M, in the ninth example displaced loudspeaker setup, a loudspeaker placement of the L loudspeaker is (0.84, 1), a loudspeaker placement of the C loudspeaker is (2.42, 0.2), a loudspeaker placement of the R loudspeaker is (4, 1), a loudspeaker placement of the RS loudspeaker is (4.64, 3.9), a loudspeaker placement of the RB loudspeaker is (3.48, 6.16), a loudspeaker placement of the LB loudspeaker is (1.36, 6.16), and a loudspeaker placement of the LS loudspeaker is (0.2, 3.9). The L loudspeaker, the C loudspeaker, the R loudspeaker, the RS loudspeaker, the RB loudspeaker, the LB loudspeaker, and the LS loudspeaker are misplaced (i.e., not at the ideal/standard loudspeaker placements of the L loudspeaker, the C loudspeaker, the R loudspeaker, the RS loudspeaker, the RB loudspeaker, the LB loudspeaker, and the LS loudspeaker as shown in FIG. 9A).

FIG. 9N is an example graph 539 illustrating a tenth example displaced loudspeaker setup, in one or more embodiments. As shown in FIG. 9N, in the tenth example displaced loudspeaker setup, a loudspeaker placement of the L loudspeaker is (1.97, 1.08) and a loudspeaker placement of the R loudspeaker is (2.87, 1.08). The L loudspeaker and the R loudspeaker are misplaced (i.e., not at the ideal/standard loudspeaker placements of the L loudspeaker and the R loudspeaker as shown in FIG. 9A).

In one embodiment, the measured data sets captured using the microphones 171 of the listening area 170 with the ten different displaced loudspeaker setups illustrated in FIGS. 9E-9N are used to train and test the neural network 230.

Figure 10:
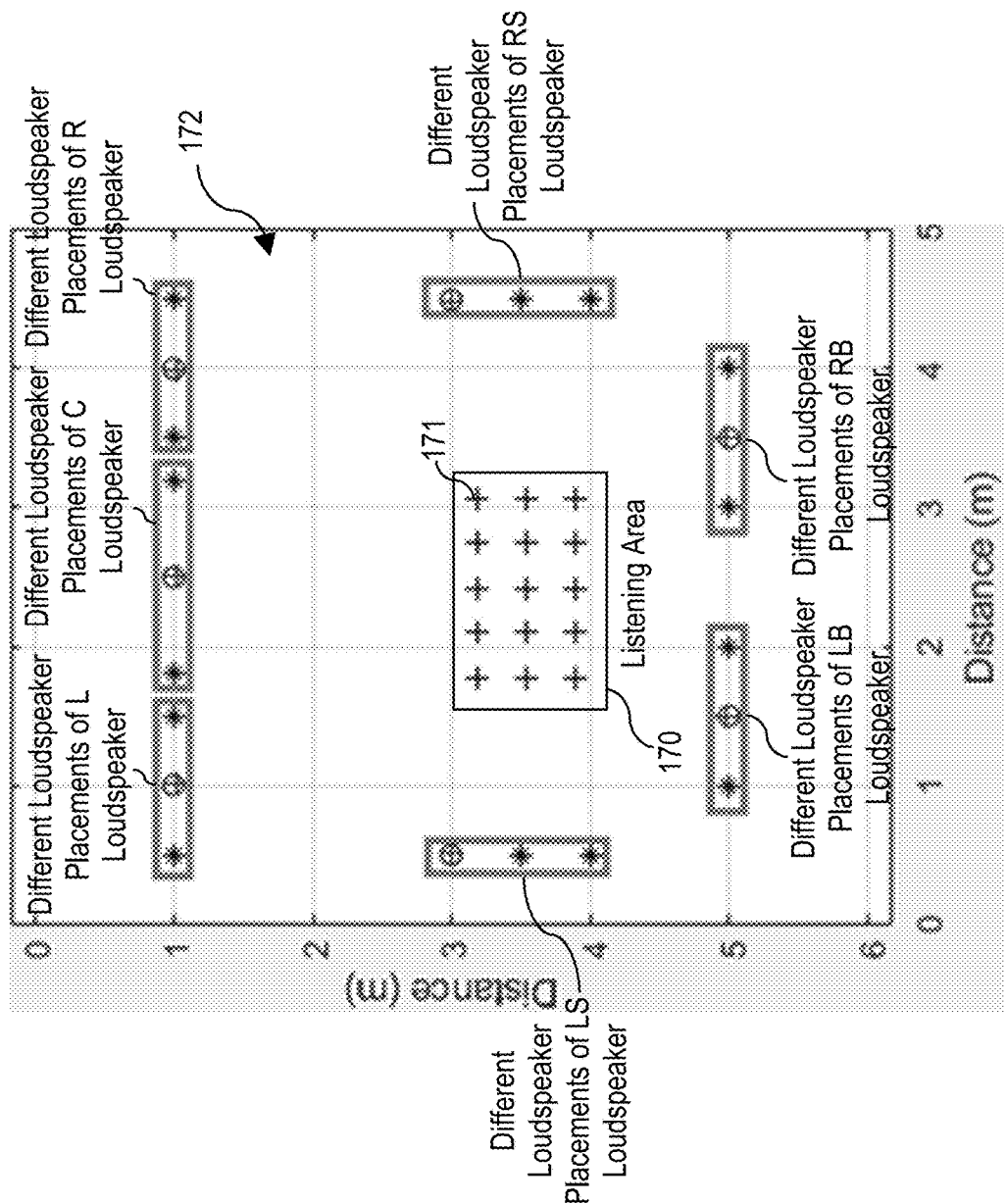
FIG. 10 is an example graph illustrating different loudspeaker placements in a listening room, in one or more embodiments.

FIG. 10 is an example graph 540 illustrating different loudspeaker placements in a listening room 172, in one or more embodiments. A horizontal axis of the graph 540 represents a width of a listening room 172 in units of width expressed in m. A vertical axis of the graph 540 represents length of a listening room 172 in units of length expressed in m. In one embodiment, training data comprises simulated data sets obtained using simulation of propagation delays with the different loudspeaker placements. For example, as shown in FIG. 10, the different loudspeaker placements may include at least one of the following: (1) different loudspeaker placements of the L loudspeaker that vary along the horizontal axis (e.g., three different loudspeaker placements with coordinates (0.5, 1.0), (1.0, 1.0), (1.5, 1.0)), (2) different loudspeaker placements of the C loudspeaker that vary along the horizontal axis (e.g., three different loudspeaker placements with coordinates (1.8, 1.0), (2.5, 1.0), (3.2, 1.0)), (3) different loudspeaker placements of the R loudspeaker that vary along the horizontal axis (e.g., three different loudspeaker placements with coordinates (3.5, 1.0), (4.0, 1.0), (4.5, 1.0)), (4) different loudspeaker placements of the RS loudspeaker that vary along the vertical axis (e.g., three different loudspeaker placements with coordinates (4.5, 3.0), (4.5, 3.5), (4.5, 4.0)), (5) different loudspeaker placements of the RB loudspeaker that vary along the horizontal axis (e.g., three different loudspeaker placements with coordinates (3.0, 5.0), (3.5, 5.0), (4.0, 5.0)), (6) different loudspeaker placements of the LB loudspeaker that vary along the horizontal axis (e.g., three different loudspeaker placements with coordinates (1.0, 5.0), (1.5, 5.0), (2.0, 5.0)), and (7) different loudspeaker placements of the LS loudspeaker that vary along the vertical axis (e.g., three different loudspeaker placements with coordinates (0.5, 3.0), (0.5, 3.5), (0.5, 4.0)).

In one embodiment, the simulated data sets obtained using simulation of propagation delays with the different loudspeaker placements are used to train and test the neural network 230.

For example, if the loudspeaker system 150 comprises seven loudspeakers 151, and the different loudspeaker placements comprise three different loudspeaker placements of each loudspeaker 151, a total number of simulated data sets is $7(3^7)=15,309$. If a total number of measured data sets is 50, training data comprising both the measured data sets and the simulated data sets has 15,359 data sets total. If 80% of the training data is used to train the neural network 230 and the remaining 20% of the training data is used to test the neural network 230, the neural network 230 is trained using 12,288 data sets and tested using 3,071 data sets.

FIG. 11 is a flowchart of an example process 600 for automatic spatial calibration, in one or more embodiments. Process block 610 includes estimating one or more distances from one or more loudspeakers (e.g., loudspeakers 151) to a listening area (e.g., listening area 170) based on a machine learning model (e.g., neural network 230) and one or more propagation delays from the one or more loudspeakers to the listening area. Process block 620 includes estimating one or more incidence angles of the one or more loudspeakers relative to the listening area based on the one or more propagation delays. Process block 630 includes applying spatial perception correction to audio reproduced by the one or more loudspeakers based on the one or more distances and the one or more incidence angles, where the spatial perception correction comprises delay and gain compensation that corrects misplacement of any of the one or more loudspeakers relative to the listening area.

In one embodiment, process blocks 610-630 may be performed by one or more components of the automatic spatial calibration system 200.

Figure 12:
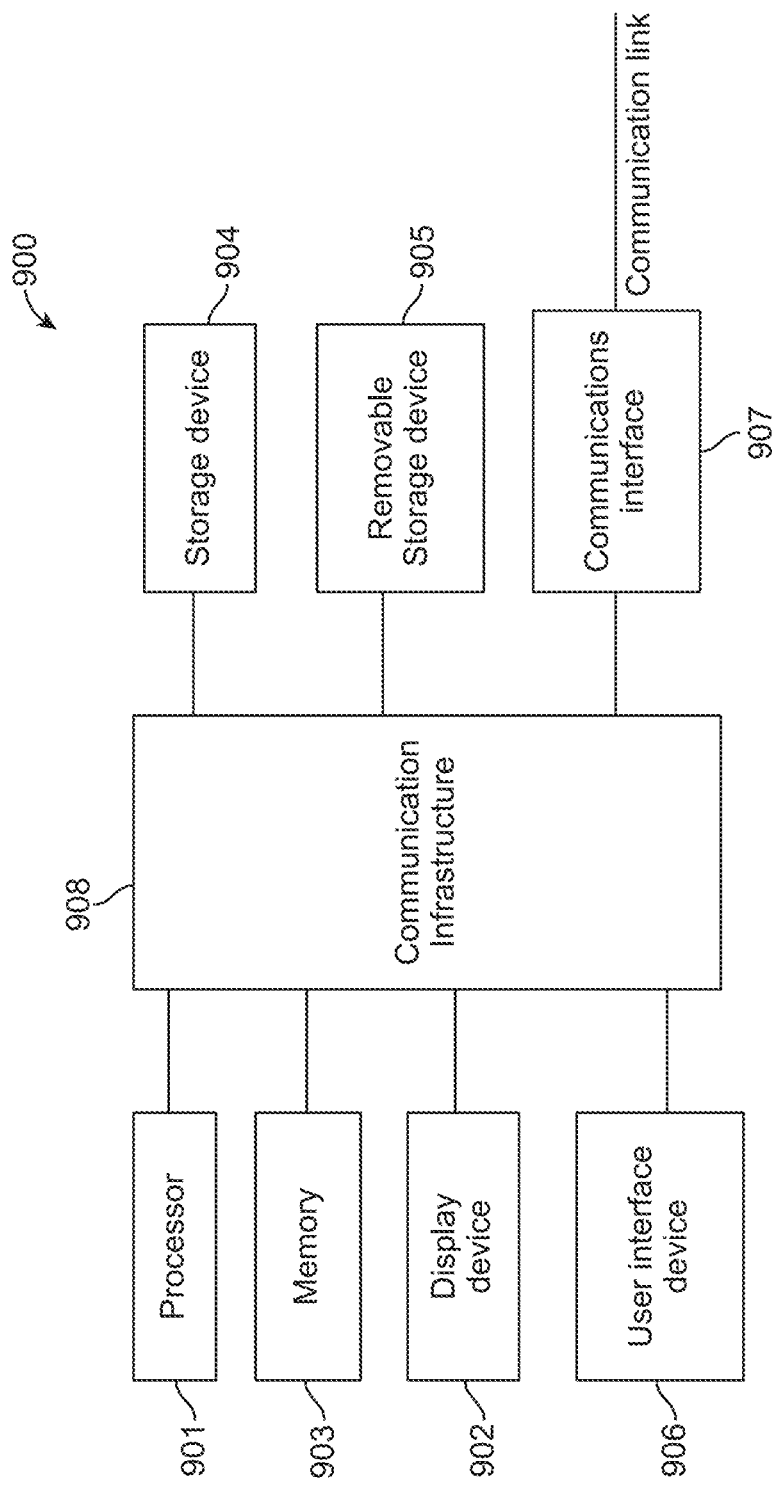
FIG. 12 is a high-level block diagram showing an information processing system comprising a computer system useful for implementing the disclosed embodiments.

FIG. 12 is a high-level block diagram showing an information processing system comprising a computer system 900 useful for implementing the disclosed embodiments. The systems 120, 200, and 300 may be incorporated in the computer system 900. The computer system 900 includes one or more processors 901, and can further include an electronic display device 902 (for displaying video, graphics, text, and other data), a main memory 903 (e.g., random access memory (RAM)), storage device 904 (e.g., hard disk drive), removable storage device 905 (e.g., removable storage drive, removable memory module, a magnetic tape drive, optical disk drive, computer readable medium having stored therein computer software and/or data), viewer interface device 906 (e.g., keyboard, touch screen, keypad, pointing device), and a communication interface 907 (e.g., modem, a network interface (such as an Ethernet card), a communications port, or a PCMCIA slot and card). The communication interface 907 allows software and data to be transferred between the computer system and external devices. The system 900 further includes a communications infrastructure 908 (e.g., a communications bus, cross-over bar, or network) to which the aforementioned devices/modules 901 through 907 are connected.

Information transferred via communications interface 907 may be in the form of signals such as electronic, electromagnetic, optical, or other signals capable of being received by communications interface 907, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 600 (FIG. 11) may be stored as program instructions on the memory 903, storage device 904, and/or the removable storage device 905 for execution by the processor 901.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof, however, other versions are possible. Therefore, the spirit and scope of the appended claims should not be limited to the description of the preferred versions contained herein.

What is claimed is:

1. A method of automatic spatial calibration, comprising:
    estimating one or more distances from one or more loudspeakers to a listening area based on a machine learning model and one or more propagation delays from the one or more loudspeakers to the listening area;
    estimating one or more incidence angles of the one or more loudspeakers relative to the listening area based on the one or more propagation delays; and
    applying spatial perception correction to audio reproduced by the one or more loudspeakers based on the one or more distances and the one or more incidence angles, wherein the spatial perception correction comprises delay and gain compensation that corrects misplacement of any of the one or more loudspeakers relative to the listening area.

2. The method of claim 1, wherein the machine learning model is a neural network.

3. The method of claim 1, wherein estimating the one or more distances from the one or more loudspeakers to the listening area comprises:
    for each of the one or more loudspeakers:
        measuring an impulse response (IR) from the loudspeaker to at least one nearfield (NF) microphone positioned within proximity of a driver of the loudspeaker;
        determining at least one propagation delay from the loudspeaker to the at least one NF microphone based on the IR; and
        estimating, via the machine learning model, at least one propagation delay from the loudspeaker to the listening area based on the at least one propagation delay from the loudspeaker to the at least one NF microphone.

4. The method of claim 1, further comprising:
    for each of the one or more loudspeakers:
        estimating a sound pressure of the loudspeaker based on at least one propagation delay from the loudspeaker to the listening area.

5. The method of claim 1, wherein estimating the one or more incidence angles of the one or more loudspeakers relative to the listening area comprises:
    for each of the one or more loudspeakers:
        estimating an incidence angle and vector components of the loudspeaker relative to the listening area based on at least one propagation delay from the loudspeaker to the listening area and a sound pressure of the loudspeaker at the listening area.

6. The method of claim 1, wherein applying the spatial perception correction to the audio reproduced by the one or more loudspeakers comprises:

for each of the one or more loudspeakers:
determining a corresponding optimal gain compensation and a corresponding optimal correction delay based on the one or more distances and the one or more incidence angles; and
applying the corresponding optimal gain compensation and the corresponding optimal correction delay to an audio channel corresponding to the loudspeaker, wherein the audio channel provides, as output, audio reproduced by the loudspeaker.

7. The method of claim 1, further comprising:
acquiring training data comprising one or more measured data sets captured using an array of microphones at the listening area; and
training and testing the machine learning model based on the training data.

8. The method of claim 7, further comprising:
augmenting the training data with one or more simulated data sets obtained using simulation of propagation delays.

9. A system of automatic spatial calibration, comprising:
at least one processor; and
a non-transitory processor-readable memory device storing instructions that when executed by the at least one processor causes the at least one processor to perform operations including:
estimating one or more distances from one or more loudspeakers to a listening area based on a machine learning model and one or more propagation delays from the one or more loudspeakers to the listening area;
estimating one or more incidence angles of the one or more loudspeakers relative to the listening area based on the one or more propagation delays; and
applying spatial perception correction to audio reproduced by the one or more loudspeakers based on the one or more distances and the one or more incidence angles, wherein the spatial perception correction comprises delay and gain compensation that corrects misplacement of any of the one or more loudspeakers relative to the listening area.

10. The system of claim 9, wherein the machine learning model is a neural network.

11. The system of claim 9, wherein estimating the one or more distances from the one or more loudspeakers to the listening area comprises:

for each of the one or more loudspeakers:
measuring an impulse response (IR) from the loudspeaker to at least one nearfield (NF) microphone positioned within proximity of a driver of the loudspeaker;
determining at least one propagation delay from the loudspeaker to the at least one NF microphone based on the IR; and
estimating, via the machine learning model, at least one propagation delay from the loudspeaker to the listening area based on the at least one propagation delay from the loudspeaker to the at least one NF microphone.

12. The system of claim 9, wherein the operations further comprise:

for each of the one or more loudspeakers:
estimating a sound pressure of the loudspeaker based on at least one propagation delay from the loudspeaker to the listening area.

13. The system of claim 9, wherein estimating the one or more incidence angles of the one or more loudspeakers relative to the listening area comprises:

for each of the one or more loudspeakers:
estimating an incidence angle and vector components of the loudspeaker relative to the listening area based on at least one propagation delay from the loudspeaker to the listening area and a sound pressure of the loudspeaker at the listening area.

14. The system of claim 9, wherein applying the spatial perception correction to the audio reproduced by the one or more loudspeakers comprises:

for each of the one or more loudspeakers:
determining a corresponding optimal gain compensation and a corresponding optimal correction delay based on the one or more distances and the one or more incidence angles; and
applying the corresponding optimal gain compensation and the corresponding optimal correction delay to an audio channel corresponding to the loudspeaker, wherein the audio channel provides, as output, audio reproduced by the loudspeaker.

15. The system of claim 9, wherein the operations further comprise:
acquiring training data comprising one or more measured data sets captured using an array of microphones at the listening area; and
training and testing the machine learning model based on the training data.

16. The system of claim 15, wherein the operations further comprise:
augmenting the training data with one or more simulated data sets obtained using simulation of propagation delays.

17. A non-transitory processor-readable medium that includes a program that when executed by a processor performs a method of automatic spatial calibration, the method comprising:
estimating one or more distances from one or more loudspeakers to a listening area based on a machine learning model and one or more propagation delays from the one or more loudspeakers to the listening area;
estimating one or more incidence angles of the one or more loudspeakers relative to the listening area based on the one or more propagation delays; and
applying spatial perception correction to audio reproduced by the one or more loudspeakers based on the one or more distances and the one or more incidence angles, wherein the spatial perception correction comprises delay and gain compensation that corrects misplacement of any of the one or more loudspeakers relative to the listening area.

18. The non-transitory processor-readable medium of claim 17, wherein the machine learning model is a neural network.

19. The non-transitory processor-readable medium of claim 17, wherein estimating the one or more distances from the one or more loudspeakers to the listening area comprises:

for each of the one or more loudspeakers:
  measuring an impulse response (IR) from the loudspeaker to at least one nearfield (NF) microphone positioned within proximity of a driver of the loudspeaker;
  determining at least one propagation delay from the loudspeaker to the at least one NF microphone based on the IR; and
  estimating, via the machine learning model, at least one propagation delay from the loudspeaker to the listening area based on the at least one propagation delay from the loudspeaker to the at least one NF microphone.

20. The non-transitory processor-readable medium of claim 17, wherein applying the spatial perception correction to the audio reproduced by the one or more loudspeakers comprises:
  for each of the one or more loudspeakers:
    determining a corresponding optimal gain compensation and a corresponding optimal correction delay based on the one or more distances and the one or more incidence angles; and
    applying the corresponding optimal gain compensation and the corresponding optimal correction delay to an audio channel corresponding to the loudspeaker, wherein the audio channel provides, as output, audio reproduced by the loudspeaker.

* * * * *